(12) United States Patent
Chosack et al.

(10) Patent No.: US 7,261,565 B2
(45) Date of Patent: Aug. 28, 2007

(54) ENDOSCOPIC TUTORIAL SYSTEM FOR THE PANCREATIC SYSTEM

(75) Inventors: Edna Chosack, Orange, OH (US); David Barkay, Kiryat Ono (IL); Ran Bronstein, Modlin (IL)

(73) Assignee: Simbionix Ltd., Lod (IL)

( * ) Notice: Subject to any disclaimer, the term of this patent is extended or adjusted under 35 U.S.C. 154(b) by 805 days.

(21) Appl. No.: 10/276,222

(22) PCT Filed: May 16, 2001

(86) PCT No.: PCT/IL01/00435

§ 371 (c)(1),
(2), (4) Date: Nov. 14, 2002

(87) PCT Pub. No.: WO01/88882

PCT Pub. Date: Nov. 22, 2001

(65) Prior Publication Data

US 2003/0108853 A1    Jun. 12, 2003

Related U.S. Application Data

(60) Provisional application No. 60/205,248, filed on May 19, 2000.

(30) Foreign Application Priority Data

May 21, 2000    (IL)    ..................................... 136264

(51) Int. Cl.
*G09B 23/28*    (2006.01)
(52) U.S. Cl. ..................................... 434/262; 434/272
(58) Field of Classification Search ................. 434/262, 434/272

See application file for complete search history.

(56) References Cited

U.S. PATENT DOCUMENTS 4,907,973 A * 3/1990 Hon ............................ 434/262

(Continued)

FOREIGN PATENT DOCUMENTS

WO    PCT WO 96/41567    12/1996

(Continued)

OTHER PUBLICATIONS

Cover et al.—Interactively Deformable Models for Surgery Simulation, 1993, IEEE Computer Graphics & applications. p. 68-75.*

(Continued)

*Primary Examiner*—Robert E. Pezzuto
*Assistant Examiner*—Cameron Saadat

(57) ABSTRACT

A method and a system for simulating the minimally invasive medical procedure of bilio-pancreatic duodenoscopy. The system is designed to simulate the actual medical procedure of bilio-pancreatic duodenoscopy as closely as possible by providing both a simulated medical instrument, and tactile and visual feedback as the simulated procedure is performed on the simulated patient. Particularly preferred features include a multi-path solution for virtual navigation in a complex anatomy. In addition, the system and method optionally and more preferably incorporate the effect of dynamic contrast injection of dye into the papilla for fluoroscopy. The injection of such dye, and the subsequent visualization of the bilio-pancreatic organ system in the presence of the duodenoscope, must be accurately simulated in terms of accurate visual feedback. In addition, the bilio-pancreatic organ system is optionally and more preferably modeled as a plurality of splines, most preferably arranged as a tree of splines or other branched structure. Thus, the system and method provide a complete solution to the complex and difficult problem of training students in bilio-pancreatic duodenoscopy procedures.

40 Claims, 15 Drawing Sheets

U.S. PATENT DOCUMENTS

| | | | | |
|---|---|---|---|---|
| 5,769,640 | A | * | 6/1998 | Jacobus et al. ............. 434/262 |
| 5,882,206 | A | * | 3/1999 | Gillio ......................... 434/262 |
| 6,201,543 | B1 | | 3/2001 | O'Donnell et al. |
| 6,283,763 | B1 | * | 9/2001 | Matsuzaki et al. .......... 434/262 |
| 6,331,116 | B1 | * | 12/2001 | Kaufman et al. ........... 434/262 |
| 6,336,812 | B1 | * | 1/2002 | Cooper et al. .............. 434/267 |

FOREIGN PATENT DOCUMENTS

| | | |
|---|---|---|
| WO | PCT WO 99/38141 | 7/1999 |
| WO | PCT WO 01/78039 | 10/2001 |

OTHER PUBLICATIONS

Pfeifer et al. "Applied Virtual Reality for Simulation of Endoscopic Retrograde Cholangio-Pancreatography (ERCP)", Health Care in the Information Age, Chapter 4: 36-42, 1996. Claims: 1,2, 15, 16, 22, 23, 26, 27.

Downes et al. "Virtual Enviroments for Training Critical Skills in Laparoscopic Surgery", Medicine Meets Virtual Reality: 316-322, 1998. Claims: 1, 26.

Holton "Strands Gravity and Biotanical Tree Imagery", The Eurographics Association: 57-67, 1994.

Young e tal. "Epicardial Surface Estimation from CoronaryAngiograms", Computer Vision Graphics and Image Processing, 47(1): 111-127, 1989.

Rombach et al. "Functional Reconstruction of the Coronary Tree from Biplane Angiographic Sequences", Medical Clinic, Cardiology, University Freiburg: 17-18, 1992. Claims: 41.

Champleboux et al. "Parametric Two-Dimensional B-spline Representation of Vein and Artery from 2.5D Echography used to Aid Virtual Echography", Computer Vision: 263-272, 1997. p. 263, 269. Claims: 41.

Guenther et al. "Hierarchical Schemes for Curve Representation", IEEE Computer Graphics & Applications: 55-63, 1993. p. 57-58. Claims: 41.

* cited by examiner

Figure 5A (con't )
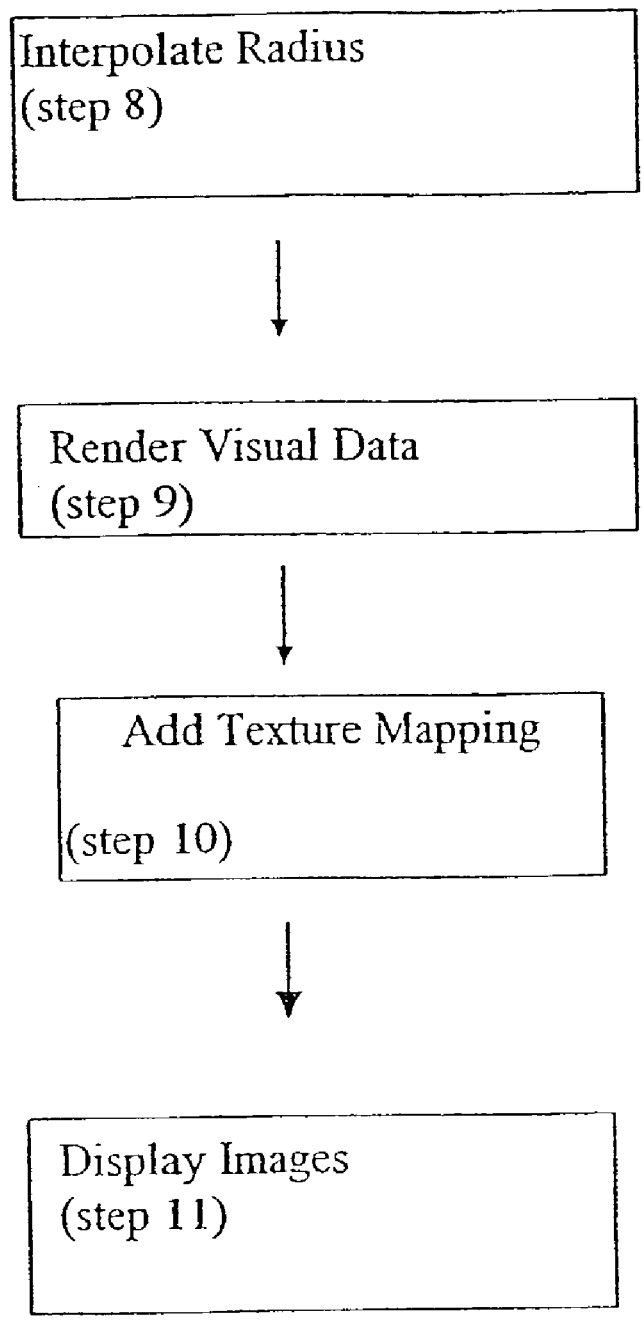

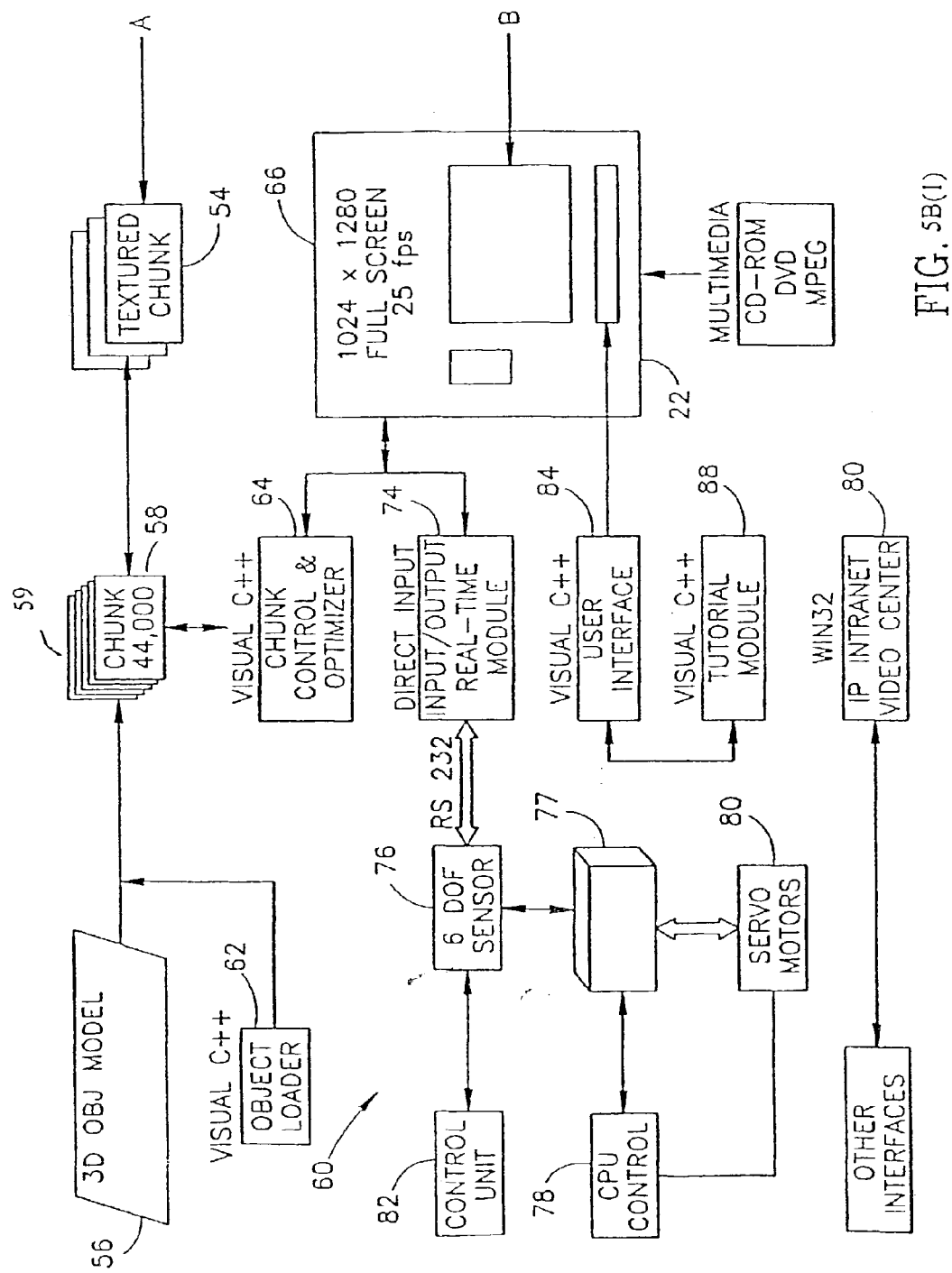
FIG. 5B(1)

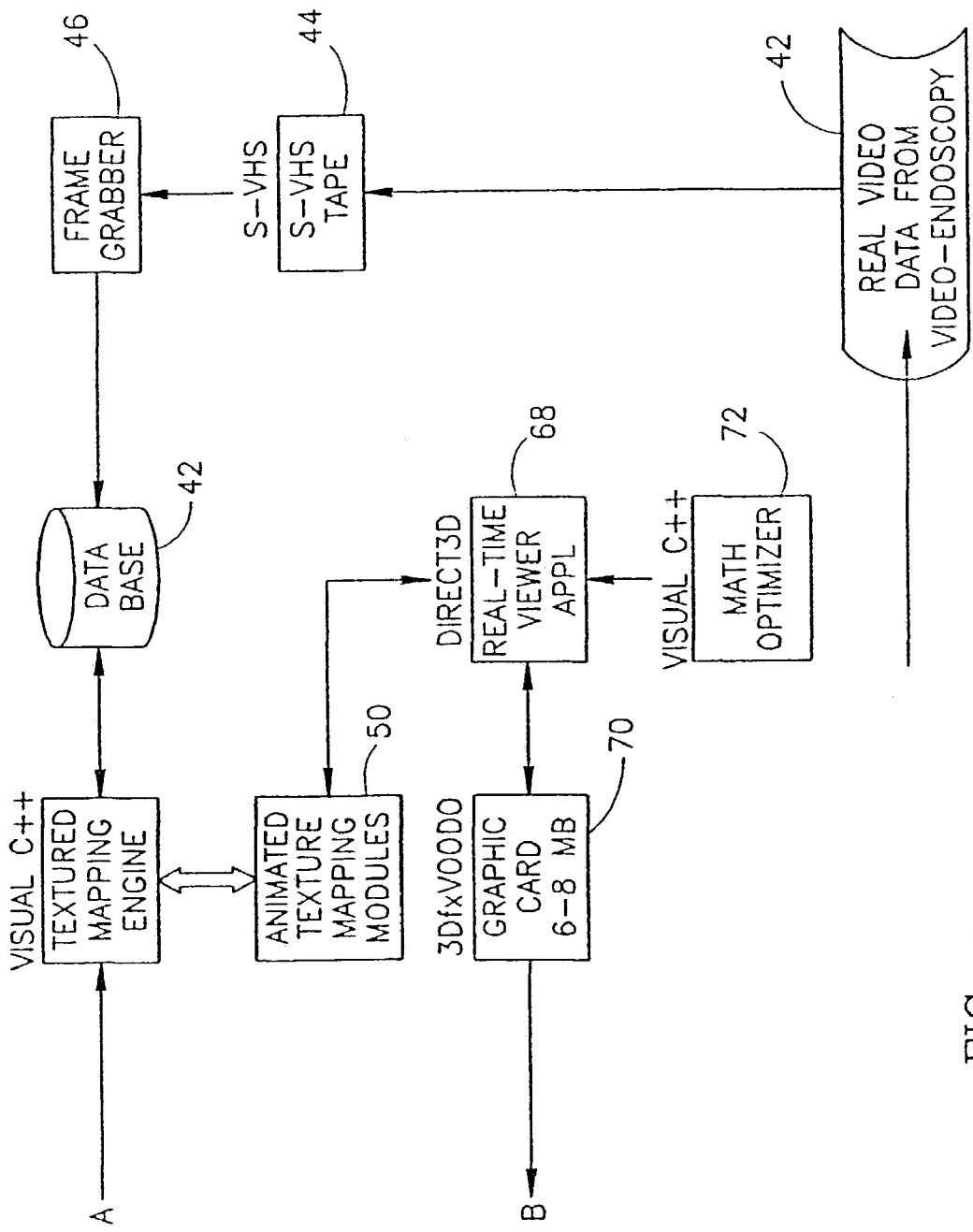
FIG. 5B(2)

Figure 12 (cont')

the geometric model is more preferably manipulated according to this new information
(step 6)

navigation is performed within the multi-spline model
(step 7)

ENDOSCOPIC TUTORIAL SYSTEM FOR THE PANCREATIC SYSTEM

RELATED PATENT APPLICATIONS

This application is a National Phase Entry of PCT/IL01/00435 filed 16 May 2001, which claims priority from U.S. Provisional Patent Application Ser. No. 60/205,248 filed 19 May 2000 and Israel Patent Application No. 136264 filed 21 May 2000.

FIELD OF THE INVENTION

The present invention relates to a system and method for teaching and training students in medical procedures, and in particular to a system and method for training students in the procedure of duodenoscopy for the bilio-pancreatic system.

BACKGROUND OF THE INVENTION

ERCP (Endoscopic Retrograde Cholangio Pancreatography) is a minimally invasive procedure which allows the doctor to perform necessary treatments such as enlarging a bile duct opening, removing gallstones lodged in the bile duct, inserting a stent (drain) in the duct or taking a biopsy specimen.

A flexible fiberoptic tube, called a duodenoscope, is passed through the mouth, esophagus and stomach into the duodenum, which is the first part of the small intestine. The duodenoscope is a thin, flexible tube with a tiny video camera and light at one side of the tip. The papilla, which is an opening where the bile and pancreatic ducts empty into the duodenum, is visually identified. A small plastic tube, or cannula, is passed through the duodenoscope into the papilla. X-ray dye is injected through the cannula into the ducts. X-rays are then taken to study the ducts. Any necessary treatments can be performed at this time.

FIG. 1 is a diagram of the portion of the gastrointestinal tract which immediately surrounds the bilio-pancreatic system, and the bilio-pancreatic system itself, while FIG. 2 is a diagram of the cannula for injecting the dye. The catheter is inserted via the papilla into the ducts. The dye is injected using the cannulate of the catheter. There are different types of catheters, some of which, called sphincterotomes, are used for sphincterotomy, to enlarge the opening of the bile duct. This procedure is done with an electrically heated wire.

Additional tools which may be used include a biliary stent. If the X-ray images show a blockage in the bile duct, the doctor may place such a biliary stent inside the duct itself to help the bile drain into the intestine in the normal way. Other tools include a basket for removing stones from the bile ducts, and balloons, which may also be used for removing stones, and for opening stenotic portions of the bile ducts.

One drawback of this procedure is that the duodenoscope must be maneuvered by the physician according to images of the gastrointestinal system and/or papilla which are received from the camera and displayed on a video screen. The lack of direct visual feedback from the organ system is one factor which renders duodenoscopy a complex and difficult procedure to master. Such lack of feedback also increases the difficulty of hand-eye coordination and correct manipulation of the duodenoscopic device. Thus, duodenoscopy of the bilio-pancreatic system is a difficult procedure to both perform and to learn.

Currently, students are taught to perform such procedures according to the traditional model for medical education, in which students observe and assist more experienced physicians. Unfortunately, such observation alone cannot provide the necessary training for such complicated medical procedures. Students may also perform procedures on animals and human cadavers, neither of which replicates the visual and tactile sensations of a live human patient. Thus, traditional medical training is not adequate for modern technologically complex medical procedures.

In an attempt to provide more realistic medical training for such procedures, simulation devices have been developed which attempt to replicate the tactile sensations and/or visual feedback for these procedures, in order to provide improved medical training without endangering human patients. An example of such a simulation device is disclosed in U.S. Pat. No. 5,403,191, in which the disclosed device is a box containing simulated human organs. Various surgical laparoscopic procedures can be performed on the simulated organs. Visual feedback is provided by a system of mirrors. However, the system of both visual and tactile feedback is primitive in this device, and does not provide a true representation of the visual and tactile sensations which would accompany such surgical procedures in a human patient. Furthermore, the box itself is not a realistic representation of the three-dimensional structure of a human patient. Thus, the disclosed device is lacking in many important aspects and fails to meet the needs of a medical simulation device.

Attempts to provide a more realistic experience from a medical simulation devices are disclosed in PCT Patent Application Nos. WO 96/166389 and WO 95/02233. Both of these applications disclose a device for providing a simulation of the surgical procedure of laparoscopy. Both devices include a mannequin in the shape of a human torso, with various points at which simulated surgical instruments are placed. However, the devices are limited in that the positions of the simulated surgical instruments are predetermined, which is not a realistic scenario. Furthermore, the visual feedback is based upon a stream of video images taken from actual surgical procedures. However, such simple rendering of video images would result in inaccurate or unrealistic images as portions of the video data would need to be removed for greater processing speed. Alternatively, the video processing would consume such massive amounts of computational time and resources that the entire system would fail to respond in a realistic time period to the actions of the student. At the very minimum, a dedicated graphics workstation would be required, rather than a personal computer (PC). Thus, neither reference teaches or discloses adequate visual processing for real time visual feedback of the simulated medical procedure.

Similarly, U.S. Pat. No. 4,907,973 discloses a device for simulating the medical procedure of flexible gastro-endoscopy. The disclosed device also suffers from the deficiencies of the above-referenced prior art devices, in that the visual feedback system is based upon rendering of video data taken from actual duodenoscopic procedures. As noted previously, displaying such data would either require massive computational resources, or else would simply require too much time for a realistic visual feedback response. Thus, the disclosed device also suffers from the deficiencies of the prior art.

A more useful and efficient medical simulation device for minimally invasive therapeutic procedures such as endoscopy is disclosed in PCT Application No. WO 99/38141, by the present inventors and incorporated by reference as if fully set forth herein. The disclosed medical simulation device provides real time, accurate and realistic visual feedback of general endoscopic procedures, as well as realistic tactile feedback, so that the visual and tactile systems are accurately linked for the simulation as for an actual medical procedure.

Duodenoscopy of the bilio-pancreatic system would also benefit from such realistic simulation, involving both visual and tactile feedback which are provided in an accurate manner. Bilio-pancreatic duodenoscopic procedures feature many of the same principles as gastro-endoscopy, since for both types of endoscopic procedures, an instrument is inserted into a body orifice, and must then be guided through a tubular organ without direct visual feedback. In addition, the physician performing the procedure must be able to correctly interpret both the indirect visual feedback provided through a video monitor, as well as the tactile feedback through the instrument itself. Therefore, both types of duodenoscopy require the physician to receive "hands-on" manual training for the correct performance of the procedure.

In addition, bilio-pancreatic duodenoscopy has other features which differ from gastro-endoscopy. For example, bilio-pancreatic duodenoscopy may also involve the optional procedure of contrast dye injection into the bilio-pancreatic system. Thus, although bilio-pancreatic duodenoscopy shares many features with gastro-endoscopy, the former procedure must be separately simulated for accurate training and simulation.

SUMMARY OF THE INVENTION

The background art does not teach or suggest a method and a system to simulate duodenoscopy of the bilio-pancreatic system. Nor does the background art teach or suggest such a system and method for providing accurate, linked visual and tactile feedback to the student.

The present invention overcomes the deficiencies of the background art by providing a method and a system to simulate the minimally invasive medical procedure of bilio-pancreatic duodenoscopy. The system is designed to simulate the actual medical procedure of bilio-pancreatic duodenoscopy as closely as possible by providing both a simulated medical instrument, and tactile and visual feedback as the simulated procedure is performed on the simulated patient. Particularly preferred features of the present invention are the provision of a multi-path solution for virtual navigation in a complex anatomy.

In addition, the present invention optionally and more preferably includes the effect of dynamic contrast injection of dye into the papilla for fluoroscopy. The injection of such dye, and the subsequent visualization of the bilio-pancreatic organ system in the presence of the duodenoscope, must be accurately simulated in terms of accurate visual feedback. Thus, the present invention provides a complete solution to the complex and difficult problem of training students in bilio-pancreatic duodenoscopy procedures.

According to preferred embodiment of the present invention, a method for mathematical modeling is provided, which preferably enables complex topographical structures to be modeled, such as simulated organs for simulated medical procedures, in order to more rapidly render visual data.

According to the present invention, there is provided a system for performing a simulated medical bilio-pancreatic duodenoscopy procedure, comprising: (a) at least a portion of a simulated bilio-pancreatic organ system; (b) a simulated duodenoscope for performing the simulated medical bilio-pancreatic duodenoscopy procedure on the at least a portion of the simulated bilio-pancreatic organ system; (c) a locator for determining a location of the simulated duodenoscope within the simulated at least a portion of a simulated bilio-pancreatic organ system; and (d) a visual display for displaying images according to the location of the simulated duodenoscope within the simulated at least a portion of a simulated bilio-pancreatic organ system for providing visual feedback, such that the images simulate actual visual data received during an actual medical procedure as performed on an actual subject.

According to another embodiment of the present invention, there is provided a method for performing a simulated duodenoscopic procedure on a simulated bilio-pancreatic organ system, comprising: providing a system for performing the simulated duodenoscopic procedure; inserting the simulated duodenoscope into the simulated bilio-pancreatic organ system; receiving visual feedback according to the displayed image; and receiving tactile feedback according to the location of the duodenoscope within the bilio-pancreatic organ system.

According to yet another embodiment of the present invention, there is provided a method for modeling a topographical structure, comprising: providing a geometric model for the structure, constructing a multi-spline tree from a plurality of splines; and mapping a relationship between the geometric model and the multi-spline tree to model the structure.

The method of the present invention for preparing a model of the simulated organ, and for rendering the visual feedback of the simulated organ during the simulated medical procedure, can be described as a plurality of instructions being performed by a data processor. As such, these instructions can be implemented in hardware, software or firmware, or a combination thereof. As software, the steps of the method of the present invention could be implemented in substantially any suitable programming language which could easily be selected by one of ordinary skill in the art, including but not limited to, C and C++.

Hereinafter, the term "simulated medical procedure" refers to the simulation of the medical procedure as performed through the system and method of the present invention. Hereinafter, the term "actual medical procedure" refers to the performance of the medical procedure on an actual, living human patient with an actual duodenoscope, such that the medical procedure is "real" rather than "simulated". Hereinafter, the term "corresponding actual organ" refers to the "real" organ of a human being or other mammal which is being simulated by the simulated organ of the present invention.

Hereinafter, the term "duodenoscopy" includes, but is not limited to, the procedure of bilio-pancreatic duodenoscopy, as previously described, and medical diagnostic and surgical procedures in which an duodenoscope is inserted into the mouth of the subject for manipulation within the bilio-pancreatic organ system of the subject. Hereinafter, the term "bilio-pancreatic organ system" refers to the pancreas, bile duct, pancreatic duct, papilla, gall bladder, and the gastro-intestinal tract, or any portion thereof. Hereinafter, the term "subject" refers to the human or lower mammal upon which the method and system of the present invention are performed or operated. Hereinafter, the term "student" refers to any human using the system of the present invention, being trained according to the present invention or being taught according to the present invention including, but not limited to, students attending medical school or a university, a medical doctor, a trained pancreatic specialist or other trained medical specialist.

BRIEF DESCRIPTION OF THE DRAWINGS

The foregoing and other objects, aspects and advantages will be better understood from the following detailed description of a preferred embodiment of the invention with reference to the drawings, wherein:

FIG. 5A is a flowchart of an exemplary method according to the present invention for preparation of the visual model of the simulated organ and rendering of visual feedback and FIG. 5B is a schematic block diagram of an exemplary visual processing and display system according to the present invention;

BRIEF DESCRIPTION OF THE INVENTION

Figure 1:
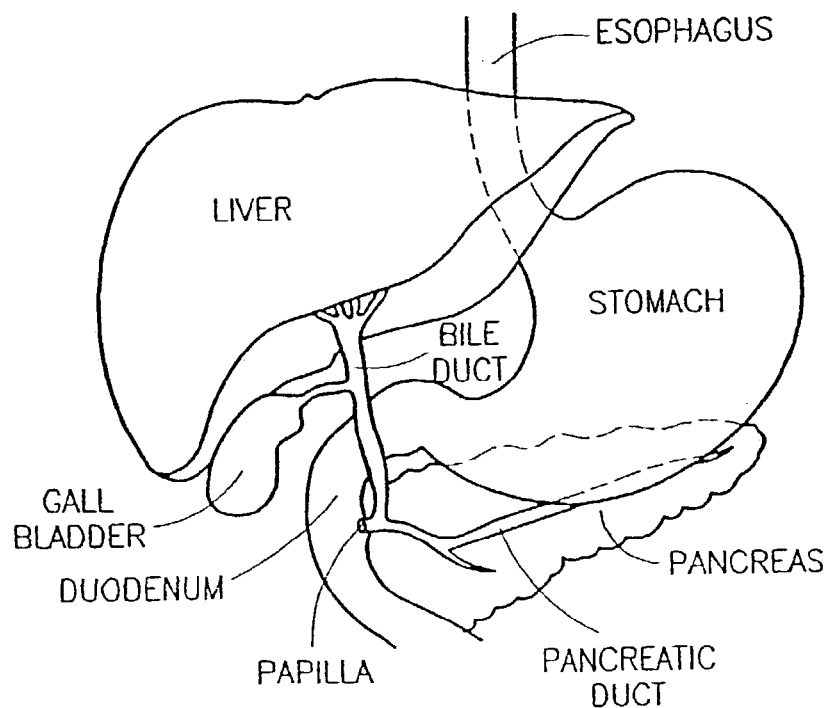
FIG. 1 is a diagram of the bilio-pancreatic system and surrounding portions of the gastrointestinal tract.
Figure 2:
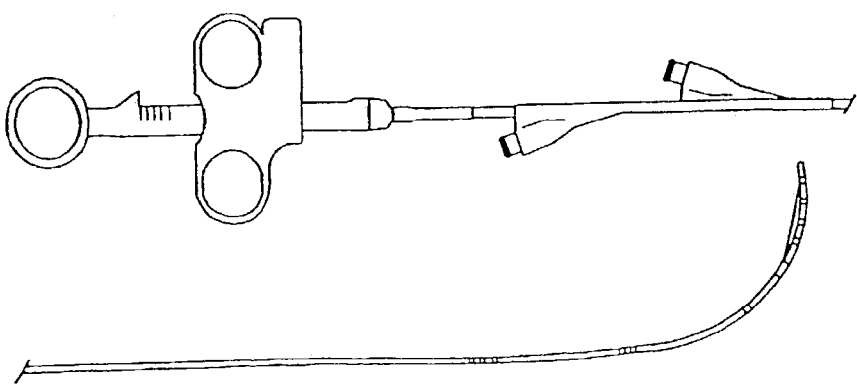
FIG. 2 is a diagram of a catheter for injecting dye into the bilio-pancreatic system.

The present invention includes a method and a system to simulate the medical procedure of bilio-pancreatic duodenoscopy. The system is designed to simulate the actual medical procedure of bilio-pancreatic duodenoscopy as closely as possible by providing both a simulated medical instrument, and tactile and visual feedback as the simulated procedure is performed on the simulated patient. Although the discussion is directed toward the medical procedure of bilio-pancreatic duodenoscopy, the present invention could also be employed to simulate other types of minimally invasive medical procedures performed on the bilio-pancreatic organ system.

The system of the present invention features both a physical model and a virtual model for the simulation of the medical procedure of bilio-pancreatic duodenoscopy. The physical model includes a mannequin with a simulated mouth into which the simulated duodenoscope is inserted, thereby accurately reflecting the performance of the actual bilio-pancreatic duodenoscopic procedure. A simulated bilio-pancreatic organ system is located within the mannequin. The simulated bilio-pancreatic organ system includes a tactile feedback system for providing realistic tactile feedback according to the movement of the simulated duodenoscope within the simulated organ.

The virtual model provides a "virtual reality" for the simulation of images from the duodenoscope. In an actual duodenoscopic medical procedure, a camera at the tip of the actual duodenoscope returns images from the bilio-pancreatic organ system of the human patient. These images are then viewed by the physician performing the duodenoscopic procedure, thereby providing visual feedback to the physician. The system of the present invention provides a "virtual reality" for the realistic simulation of this visual feedback. This virtual reality enables the real-time display of realistic images of the bilio-pancreatic organ system on a video monitor according to the manipulations of the simulated duodenoscope, preferably in such a manner that the tactile and visual feedback are linked as they would be in a human patient.

The virtual reality has two main components: a three-dimensional, mathematical model of the bilio-pancreatic organ system, or a portion thereof, and a database of enhanced digitized images derived from actual visual data obtained from actual duodenoscopic procedures. The complex mathematical model and the enhanced digitized images are combined to provide realistic visual feedback by using the enhanced images as texture mapping to overlay the mathematical model of the simulated organ, thereby closely simulating images obtained from the actual procedure.

The virtual reality feedback of the bilio-pancreatic organ system is particularly advantageous for simulating images because it does not rely on video streams, which require massive computational power for real-time display of visual feedback. In addition, video streams provide only a predetermined flow of images and cannot provide visual data with six degrees of freedom in real time. Furthermore, the virtual reality of the present invention does not rely merely on a mathematical model of the bilio-pancreatic organ system, which cannot capture the irregularities and subtle visual features of actual pancreatic tissue from a human patient. Thus, the virtual reality feedback of the bilio-pancreatic organ system in the present invention provides the best simulation of realistic images in real time for visual feedback.

According to a preferred feature of the present invention, such complex visual feedback is provided in real time by using a particularly preferred embodiment of the three-dimensional mathematical model for modeling topographically complex structures. This optional but preferred mathematical model uses a plurality of splines, arranged as a spline tree, to model such structures as the pancreatic organ system, which is itself a complex branched structure. The use of such a model enables the visual feedback to be more rapidly and efficiently provided to the student or other user.

DETAILED DESCRIPTION OF PREFERRED EMBODIMENTS

The present invention is related to a method and a system to simulate the procedure of bilio-pancreatic duodenoscopy. The system is designed to simulate the actual medical procedure of bilio-pancreatic duodenoscopy as closely as possible by providing both a simulated medical instrument, and tactile and visual feedback as the simulated procedure is performed on the simulated patient. The present invention preferably includes a method for modeling the complex, branched anatomical structure of the bilio-pancreatic organ system according to a mathematical model. This anatomical structure has three different paths, which are preferably incorporated into the mathematical model: the duodenum and other portions of the gastro-intestinal tract; the bile duct and gallbladder; and the pancreatic duct and pancreas.

A particularly preferred feature of the present invention is the simulation of the procedure of dynamic contrast injection of dye into the papilla for fluoroscopy. The injection of such dye, and the subsequent visualization of the bilio-pancreatic organ system in the presence of the duodenoscope, must be accurately simulated in terms of accurate visual feedback. Thus, the present invention provides a complete solution to the complex and difficult problem of training students in bilio-pancreatic duodenoscopy procedures.

The system of the present invention includes a mannequin with a mouth into which the simulated duodenoscope, with associated duodenoscope, is inserted. Visual feedback is provided through a video monitor, which displays realistic images in real time, according to the manipulations of the simulated duodenoscope. Realistic tactile feedback is also provided, preferably in such a manner that the tactile and visual feedback are linked as they would be in a human patient. Preferably, the present invention also features a tutorial system for training students and testing their performance. Thus, the system and method of the present invention provide a realistic simulation of the medical procedure of bilio-pancreatic duodenoscopy for training and testing students.

According to another preferred feature of the present invention, there is provided an optional but particularly preferred method for modeling complex topographical structures with a mathematical model. The mathematical model preferably includes a geometrical model of the structure, and a tree of a plurality of splines, or a "multi-spline". Each point of the geometrical model is then more preferably mapped to a branch spline of the tree of splines. Navigation through the geometrical model is then optionally and more preferably performed through the tree of splines, thus simplifying the method for modeling the topographical structure.

The principles and operation of a method and a system according to the present invention for the simulation of the medical procedure of bilio-pancreatic duodenoscopy, preferably including communicating tutorial results and measurement of student skills to the teacher or supervising medical personnel, may be better understood with reference to the drawings and the accompanying description, it being understood that these drawings are given for illustrative purposes only and are not meant to be limiting.

Figure 3:
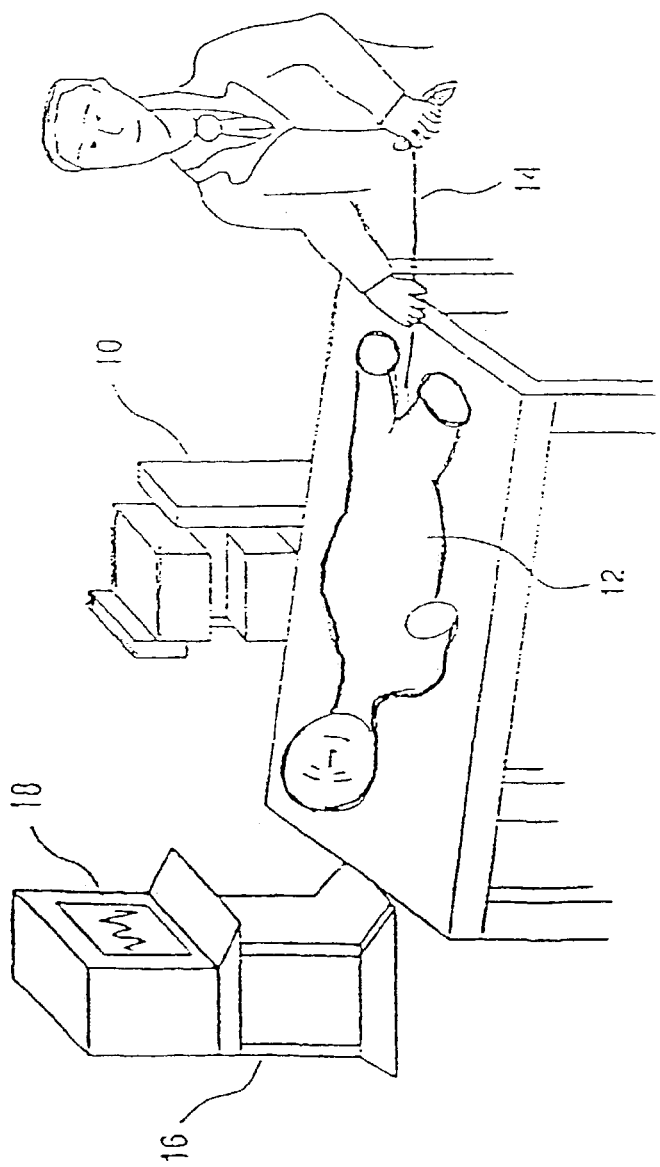
FIG. 3 is an exemplary illustration of the system for simulation of bilio-pancreatic duodenoscopy according to the present invention.

Referring now to the drawings, FIG. 3 depicts an exemplary, illustrative system for medical simulation according to the present invention. A system 10 includes a mannequin 12 representing the subject on which the procedure is to be performed, a simulated duodenoscope 14 and a computer 16 with a video monitor 18. A student 20 is shown interacting with system 10 by manipulating simulated duodenoscope 14 within mannequin 12. Mannequin 12 includes a simulated bilio-pancreatic organ system into which simulated duodenoscope 14 is inserted (not shown). As student 20 manipulates simulated duodenoscope 14, tactile and visual feedback are determined according to the position of duodenoscope 14 within the simulated bilio-pancreatic organ system. The visual feedback are provided in the form of a display on video monitor 18. The necessary data calculations are performed by computer 16, so that realistic tactile and visual feedback are provided to student 20.

Figure 4:
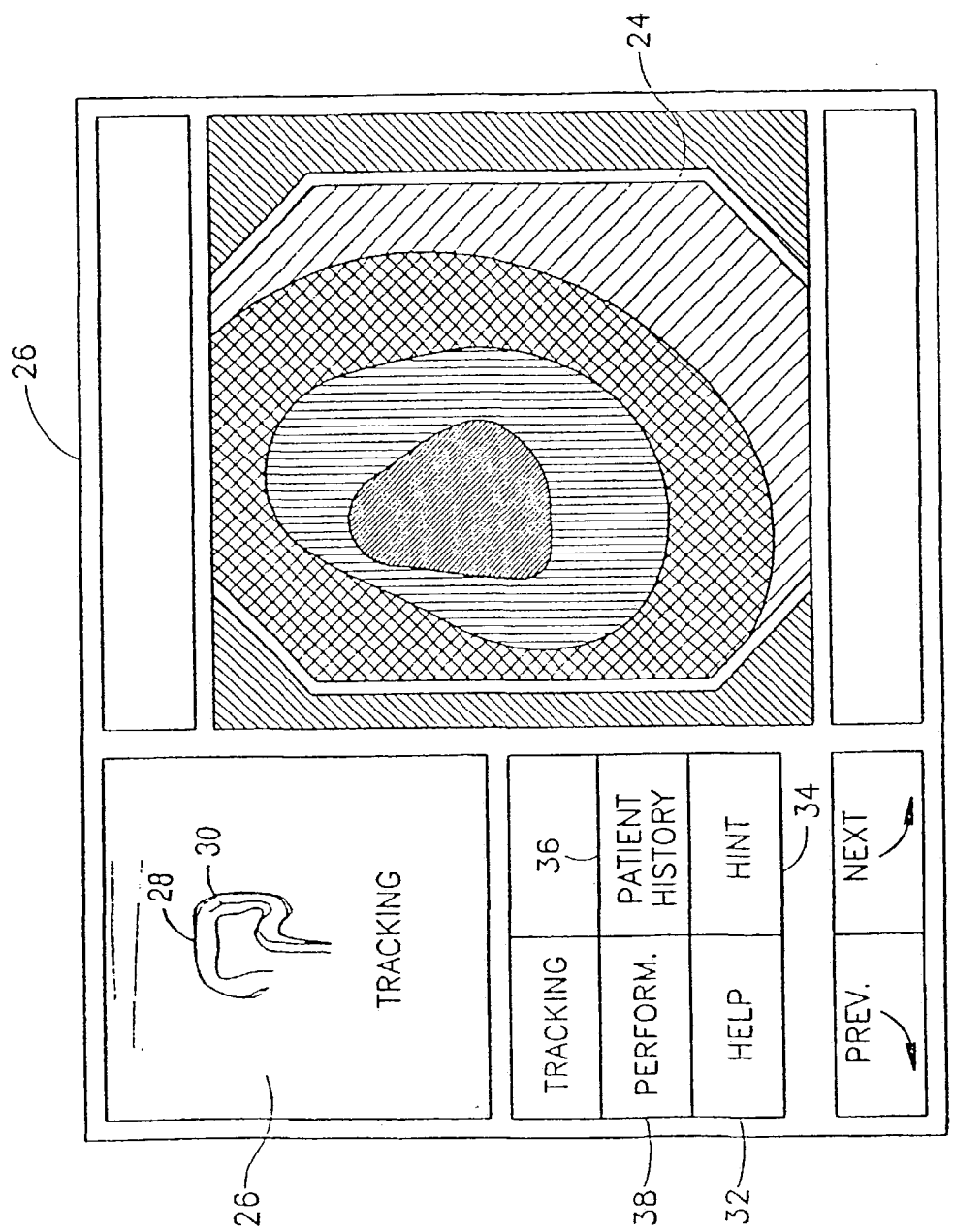
FIG. 4 is an exemplary illustration of a screen display according to the present invention.

FIG. 4 is an exemplary illustration of a screen display shown on monitor 18. A screen display 22 includes a feedback image 24. Feedback image 24 represents the visual image as seen if the duodenoscope were inserted into a living human patient. Feedback image 24 is an accurate and realistic simulation of the visual data that would be received from that portion of the bilio-pancreatic organ system in the living human patient. Although feedback image 24 is shown as a static image, it is understood that this is for illustrative purposes only and the actual visual feedback data would be in the form of a substantially continuous flow of simulated images based upon actual video stream data obtained from an actual duodenoscopic procedure. Thus, the flow of images represented by feedback image 24 gives the student (not shown) realistic visual feedback.

In addition, screen display 22 preferably includes a number of GUI (graphic user interface) features related to the preferred tutorial functions of the present invention. For example, a tracking display 26 explicitly shows the location of the simulated duodenoscope within the simulated bilio-pancreatic organ system. Tracking display 26 includes a schematic bilio-pancreatic organ system 28, into which a schematic duodenoscope 30 has been inserted. Preferably, tracking display 26 can be enabled or disabled, so that the student can only see tracking display 26 if the tracking function is enabled.

Additional, optional but preferred features of screen display 22 include the provision of a "help" button 32, which upon activation could cause the display of such helpful information as a guide to the controls of the duodenoscope. Similarly, a preferred "hint" button 34 would give the student one or more suggestions on how to continue the performance of the medical procedure. A preferred "patient history" button 36 would cause screen display 22 to show information related to one of a selection of simulated "patient histories", which could be of help to the student in deciding upon a further action. Finally, a preferred "performance" button 38 would cause screen display 22 to display a review and rating of the performance of the student. All of these functions are part of the preferred embodiment of a tutorial system for training a student in the medical procedure of bilio-pancreatic duodenoscopy, as described in further detail in FIG. 6.

Figure 5A:
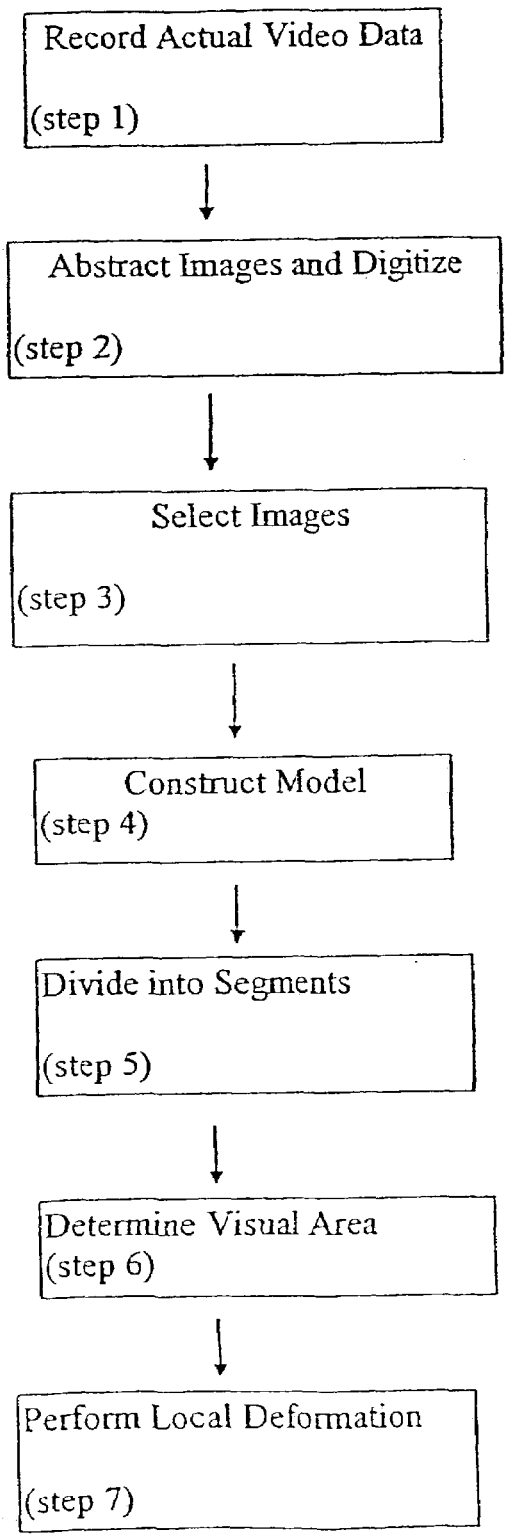

FIGS. 5A and 5B are schematic block diagrams of an exemplary visual processing and display system and method according to the present invention. FIG. 5A is a flow chart of the method for visual processing and display according to the present invention, and is intended as a summary of the method employed by the system of FIG. 5B. Further details concerning particular aspects of the method are described below with reference to FIG. 5B.

The method and system of the present invention provide a solution to a number of problems in the art of simulation of the procedure of bilio-pancreatic duodenoscopy. This procedure involves the visual display of an interior portion of the bilio-pancreatic organ system. The actual display depends upon the portion of the bilio-pancreatic organ system which is being viewed. For example, the esophagus is a large tube, while the papilla is a small opening accessible through the duodenum, leading to two branches: the bile duct and gallbladder, and the pancreatic duct and pancreas. The inner surface of each of these organs is generally deformable, as well as being specifically, locally deformable. All of these deformations in space must be calculated according to the mathematical model of the particular portion of the bilio-pancreatic organ system, and then rendered visually in real time in order to provide a realistic visual feedback response for the user.

FIG. 5A shows a preferred embodiment of the method of the present invention for preparation of the model and rendering of visual feedback, including steps required for preparation of the computerized model of the bilio-pancreatic organ system, as well as steps required for display of the bilio-pancreatic organ system.

In step 1 of the method of the present invention, actual video data are recorded onto videotape during the performance of the actual medical procedure of duodenoscopy on a living human patient. In addition, such data could also include MRI (magnetic resonance imaging) and CAT (computer assisted tomography) scan data, and/or fluoroscopy data from diagnostic radiology, from procedures performed on living human patients.

In step 2, individual images are abstracted, for example with a framegrabber device, and then digitized. In step 3, the digitized images are preferably selected for clarity and lack of visual artifacts, and are then stored in a texture mapping database. More preferably, the digitized images are enhanced before being stored. Most preferably, the texture mapping also include animation. Such animation could simulate effects such as the flow of biological fluids such as blood, flowing downward due to the influence of gravity.

In step 4, a three-dimensional mathematical model of the human bilio-pancreatic organ system is constructed. Such a model optionally and preferably features a plurality of paths, as the bilio-pancreatic organ system represents a complex anatomical structure. As previously described, this anatomical structure has three different paths, which are preferably incorporated into the mathematical model: the duodenum and other portions of the gastro-intestinal tract, the bile duct and gallbladder; and the pancreatic duct and pancreas. Thus, the mathematical model for the bilio-pancreatic organ system is preferably branched, such that the duodenoscope may optionally be threaded along any of the branches.

Unfortunately, the duodenoscope itself is most easily modeled by a single path mathematical model. The location of the virtual tip of the duodenoscope is preferably determined according to the amount of the duodenoscope which has been inserted into the bilio-pancreatic organ system, and the angle of the virtual tip, as more preferably measured by a six degrees of freedom (6 DOF) sensor. Thus, the movement of the duodenoscope is most preferably limited to a single path through a single anatomical structure.

In order to overcome this limitation, the mathematical model preferably features a plurality of paths, which are automatically switched according to the movement of the simulated duodenoscope through the simulated bilio-pancreatic organ system. The three-dimensional mathematical model of the bilio-pancreatic organ system which is particularly preferred for the present invention is a polygonal model which uses a spline. This mathematical function represents the bilio-pancreatic organ system as a series of curves, such that the points in the three-dimensional structure of each portion of the bilio-pancreatic organ system are mapped to the spline. For example, the duodenum, bile duct and pancreatic duct could each be separately modeled as a straight line which is deformed by altering the spline for the model until the model fits the data. The gall bladder is preferably modeled as a plurality of splines, in order to define the three-dimensional open volume of the gall bladder. Alternatively, the spline could be placed inside each portion of the bilio-pancreatic organ system, and then mapped to that portion of the organ system. Preferably, multiple splines are used to model the junction of the bile duct and gall bladder, for example.

The mapping can be performed according to three-dimensional coordinates, along the x, y and z axes. Alternatively, the mapping can be performed according to coordinates of time, angle and radius within each portion of the bilio-pancreatic organ system. A mixture of these two different types of coordinates is also optionally employed, in which the coordinates are time, x and y for example. Both the spline itself and the mapping from the spline to the organ system can be altered in order to provide new and different visual representations of each portion of the organ system, for example in order to provide a plurality of theoretical "test cases" for students to study. The alteration is optionally performed according to MRI (magnetic resonance imaging) data, for example. In addition, optionally and preferably data from MRI and/or CAT scan procedures, and/or fluoroscopic procedures for diagnostic radiology, are cleaned and reassembled according to the mathematical model, in order to more accurately determine the geometry of the simulated bilio-pancreatic organ system. Thus, the preferred mathematical model of the present invention permits the data to be rapidly visually rendered onto the model of the bilio-pancreatic organ system.

The method of visually rendering the bilio-pancreatic organ system according to the present invention optionally and preferably includes a number of steps, described below, which are optionally and more preferably performed as software instructions operated by a data processor. The method preferably includes the step (shown as step 5 in FIG. 5A) of dividing the bilio-pancreatic organ system into a plurality of portions. The division is made linearly, since the spatial movement of the simulated duodenoscope is limited. In other words, the simulated duodenoscope cannot "jump" from one portion of the organ system to another, but must instead proceed in a linear fashion along the simulated bilio-pancreatic organ system. In addition, the simulated duodenoscope can only be moved at a finite speed through the simulated organ system. Thus, the duodenoscope must pass through each segment of the three-dimensional model of the organ system in sequence at a known, limited speed.

The consequences of such a division is that only one segment needs to be processed in any given moment, although a plurality of such segments could be processed substantially simultaneously if the computing resources were available. Furthermore, the division reduces the visual processing into a much more manageable task, since this model may optionally include thousands of polygons in the preferred embodiment, although each segment has far fewer polygons.

In addition, preferably only those portions which are in the line of sight of the camera, and hence either immediately visible or soon to become visible, are selected for visual rendering in order to decrease the computations required for the rendering. More preferably, the number of portions which are rendered is not predetermined, since under certain circumstances, the number of portions in the line of sight may vary. For example, when the camera is traveling around a bend in the organ system, the line of sight of the camera is very short, such that relatively fewer portions, or else smaller such portions, must be rendered.

It should be noted that an exception to the prohibition against "jumping" between portions of the bilio-pancreatic organ system is the movement of the tip of the duodenoscope between different paths, or branches, of the organ system. As previously described, the bilio-pancreatic organ system has a common entry structure, the duodenum. The duodenoscope can then optionally travel along any one of three different paths: through the papilla to the bile duct or pancreatic duct, or further along the duodenum to the remainder of the gastrointestinal tract. Thus, the procedure of segmentation also optionally and more preferably includes the step of determining through which of the three different branched paths the duodenoscope is moving.

According to a further preferred embodiment of the present invention, as described in further detail with regard to FIG. 8 below, the mathematical model for simulation of the bilio-pancreatic organ system optionally features a plurality of switching objects at the junction of each path. For example, preferably at least one such switching object is located at the junction of the papilla with each of the bile duct and pancreatic duct. As the tip of the simulated duodenoscope and/or duodenoscope "touches" each such object, according to the location of the virtual tip within the simulated organ system, the mathematical model is preferably switched to the appropriate path for that portion of the bilio-pancreatic organ system.

According to preferred embodiments of the present invention, the previously described three-dimensional mathematical model of the human bilio-pancreatic organ system is constructed as a plurality of splines, such that these splines collectively form a branched structure, such as a spline tree. This mathematical function represents the bilio-pancreatic organ system as a series of curves, such that the points in the three-dimensional structure of the bilio-pancreatic organ system are mapped to the spline. For example, the bilio-pancreatic organ system could be modeled as a straight line which is deformed by altering the spline for the model until the model fits the data. Alternatively, the spline could be placed inside the bilio-pancreatic organ system and mapped to the bilio-pancreatic organ system. Preferably, multiple splines are used to model the junction of the stomach and small intestine, for example.

As previously described, the mapping can be performed according to three-dimensional coordinates, along the x, y and z axes. Alternatively, the mapping can be performed according to coordinates of time, angle and radius within the bilio-pancreatic organ system. A mixture of these two different types of coordinates is also optionally employed, in which the coordinates are time, x and y for example.

Next, in step 6, the visual attributes of the area of the organ system being scanned by the camera are determined. Preferably, these visual attributes are determined according to a number of factors, including the location of the tip of the duodenoscope, which holds the camera, and the direction in which the camera itself is pointed. Other important factors include the shape of the organ system being modeled and the history of movement of the camera through the organ system. With regard to the latter factor, the previous movements of the duodenoscope through the organ system, as determined by the actions of the student, have a significant impact on the area of the organ system which is visualized by the camera at any given moment.

In step 7, preferably a local deformation to at least one of these portions is analyzed to determine if such a deformation affects the spline itself. The mapped coordinates are then rapidly transformed from time, angle and radius to x, y and z. Next, in step 8 preferably the local deformation of the tissue of the organ system is determined through interpolation of the radius, in order to determine the degree of such deformation. Since the time, angle and radius may not give sufficient information to perform this calculation, optionally and preferably the volume of the organ system is additionally altered according to predefined mathematical models.

For deformations on a highly local scale, such as the point of contact between the tip of the duodenoscopic instrument and the organ system at a low degree of force from the instrument, preferably the level of details in the area is increased by adding more polygons to the calculations performed with the model in order to be able to stretch all, or at least a significant majority of, the points in the immediate area without distortion. The stretching is preferably performed according to a predetermined function which preferably enables the spline model to be altered locally.

This preferred method for modeling "stretching" of the organ system can also be used to model local areas of irregularity such as a blockage of the bile duct for example. Such a blockage can be mapped point by point onto the model of the bile duct portion of the organ system, thereby adjusting the visual representation of the tissue to accommodate both the blockage itself and the structural alterations of the tissue surrounding the blockage.

Next, in step 9, the various types of data which were previously described are used to actually render the visual data onto the organ system. Initially, the mapping of such data onto the model optionally and preferably involves some adjustments, performed manually by a software programmer. Alternatively, such mapping could be entirely automatically performed.

In step 10, texture mapping from the database is overlaid onto the chunk of the model. Preferably, such texture mapping includes both the digitized images and additional animation. In step 11, the resultant images are displayed. As noted previously, the images are displayed in a continuous flow according to the location of the simulated duodenoscope within the simulated bilio-pancreatic organ system. Also as noted previously, such mapping of coordinates is preferably performed according to the mathematical model of the organ system, which more preferably includes at least one, and most preferably a plurality of, splines.

FIG. 5B shows the visual processing and display system according to the present invention in more detail. A visual processing and display system 40 includes screen display 22 for displaying the processed visual data. The visual data are constructed as follows. First, data are recorded from actual bilio-pancreatic duodenoscopy procedures onto videotape, as shown in a recording block 42. The data are preferably stored on Super-VHF videotape in order to obtain the highest quality representation of the visual images displayed on the screen during the actual-duodenoscopic procedure, as shown in block 44. Next, at least a portion of the frames of the videotape, and preferably substantially all the frames, are abstracted individually by a frame-grabber 46 to form digitized images. Individual digitized images can then be selected for clarity and lack of artifacts such as reflections from the duodenoscopic apparatus itself. The images in the selected frames are then preferably enhanced and added to a texture mapping database 48.

Preferably, two types of texture mapping are stored in the database. The first type of texture mapping is intended to enhance the realistic visual aspects of the images, for example by removing visual artifacts. The second type of texture mapping is intended to simulate the behavior of a live organ system and a real duodenoscope, as represented by block 50. During actual duodenoscopic procedures on a living human patient, the tissue of the organ system moves somewhat, and the duodenoscope itself vibrates and wobbles. This movement is simulated visually by the addition of animation of the images. Other types of movement may optionally be simulated by the addition of such effects as liquid flowing downward due to the influence of gravity. Such animation enhances the realistic nature of the visual representation of the organ system.

In order for the enhanced images to be correctly displayed, the images must correspond to the manipulation and location of the simulated duodenoscope within the simulated organ system. In particular, the texture mapping of the images should correspond to the location of the duodenoscope within the organ system. Such correspondence between the location of the duodenoscope within the organ system and the texture mapping is provided by a texture mapping engine 52. The texture mapping data is then readily accessed by the display portion of visual system 40, as shown by block 54.

However, as noted for previous prior art devices, simply reproducing the selected enhanced frames in a massive video stream would quickly overwhelm the computational resources and cause the visual display to become unsynchronized from the physical location of the simulated duodenoscope. Furthermore, such a video stream would not enable the correct display of images according to the movement of the duodenoscope, which preferably has six degrees of freedom. Thus, mere reproduction is not sufficient to ensure realistic images, even when mapped onto a three-dimensional surface.

Preferably, visual processing and display system 40 includes a three-dimensional mathematical model of at least a portion of the bilio-pancreatic organ system 56, more preferably constructed as described in FIG. 5A. For the purposes of discussion, model 56 is herein described as a three-dimensional model of the organ system, it being understood that this is not meant to be limiting in any way. Model 56 preferably features a plurality of segments 58, more preferably many such segments 58, and a plurality of paths 59.

As the simulated duodenoscope moves along the simulated organ system, the location of the duodenoscope is given to a locator 60, described in further detail below. Locator 60 then instructs an object loader 62 to load the relevant segment 58 for access by visual system 40, as shown in block 54 and previously described. In the preferred embodiment shown, preferably three segments 58 of a particular path 59, and/or of a junction between paths 59, are ready for access by object loader 62 at any given moment. The specific segment 58 and/or path 59 in which the duodenoscope is currently located is preferably held in DRAM or RAM, in combination with the texture mapping described previously. The next segment 58 and the preceding segment 58 preferably are also stored in an easily accessible location, although not necessarily in RAM or DRAM.

Preferably, the display of each image from specific segment 58 into which the simulated duodenoscope has entered is optimized by a segment optimizer 64. Segment optimizer 64 receives information from locator 60, as well as the series of images obtained from overlaying the texture mapping onto the relevant segment 58, and then feeds each specific image to a display manager 66 for display on screen display 22.

In addition, display manager 66 is assisted by a real-time viewer 68, preferably implemented in Direct 3D™ (Microsoft Corp., USA). Real-time viewer 68 provides the necessary software support to communicate with a graphics card 70 for actual display of the images on screen display 22. Although graphics card 70 can be of any suitable manufacture, preferably graphics card 70 has at least 8, and more preferably at least 16, Mb of VRAM for optimal performance. An example of a suitable graphics card 70 is the 3Dfx Voodoo Rush™ card. Preferably, the performance of real-time viewer 68 is enhanced by a math optimizer 72, preferably implemented in Visual C++.

The interaction between segment optimizer 64 and display manager 66 on the one hand, and locator 60 on the other, is provided through a software interface 74, preferably implemented as a Direct Plug-in™ (Microsoft Corp., USA). Software interface 74 enables locator 60 to communicate with the other components of visual system 40, in order to provide information regarding the location of the duodenoscope within the organ system.

In preferred embodiments of the present invention, locator 60 includes a sensor 76, which can be obtained from Ascension Technology Corp., for example. Sensor 76 senses positional information from within a simulated organ 77. Sensor 76 is controlled by a control unit 82.

Visual system 40 also includes a user interface 84, preferably implemented in Visual C++. User interface 84 includes the GUI features described previously for FIG. 4. In addition, user interface 84 enables visual system 40 to interact with the preferred feature of a network interface 86, for example, so that other students can view screen display 22 over a network. User interface 84 also permits the tutorial functions of at least one, and preferably a plurality of, tutorial modules 88 to be activated. Tutorial module 88 could include a particular scenario, such as a subject with gall bladder stones, so that different types of diagnostic and medical challenges could be presented to the student. The student would then need to respond correctly to the presented scenario.

Figure 6:
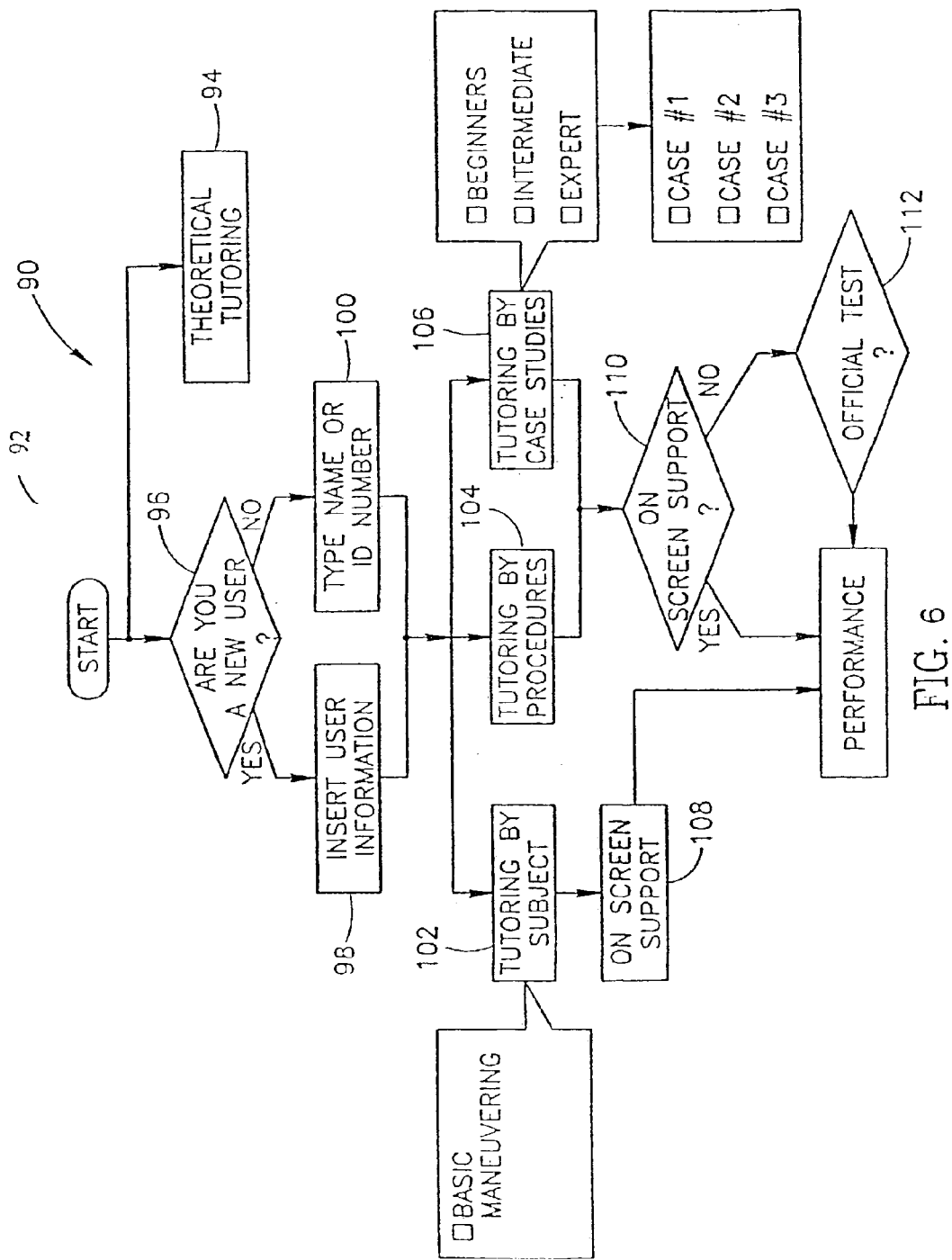
FIG. 6 is a schematic block diagram of an exemplary tutorial system according to the present invention.

An example of the tutorial system is illustrated in more detail in the block diagram of FIG. 6. A tutorial system 90 starts as shown in block 92. Next, the user must select whether actual interaction with the simulated duodenoscope is desired, or if the user prefers to receive tutoring in the theory of duodenoscopy, as shown in a block 94. The next display asks if the user is new, as shown in a block 96. If the answer is "yes", the user is requested to enter certain information, as shown by block 98. If the answer is "no", the user is requested to enter identification information, such as user name or identification number, as shown in block 100.

Next, the user must select the type of tutoring. For example, the user could select tutoring by subject 102, tutoring by procedures 104 or tutoring by case studies 106. Tutoring by subject 102 includes, but is not limited to, such subjects as basic manipulation of the duodenoscope, biopsy and tumor removal. Tutoring by subject 102 includes on-screen support, as shown in block 108.

Tutoring by case studies 106 can be selected both according to case number and according to the level of the desired cases, such as beginner, intermediate and expert. Preferably, individual case studies could be created by a teacher or professor, by combining features of various stored cases. For example, a professor could create a case history appropriate for a 50 year old male with gall bladder stones, so that the student would then be able to practice duodenoscopy on such a patient. Thus, tutoring system 90 preferably has the flexibility to enable many different types of "patients" to be studied.

If desired, on-screen support can be provided for both tutoring by case studies 106 and tutoring by procedures 104, as shown in block 110. If on-screen support is not desired, the user can indicate whether the tutoring session is actually an official test, as shown in block 112. Thus, tutoring system 90 includes both the ability to teach and the ability to test the student.

According to a preferred embodiment of the present invention, the tutorial system also includes a simplified version of the simulated duodenoscopic process for teaching the proper manipulation of the duodenoscope according to visual feedback, as well as for enabling the student to understand the correspondence between the visual feedback and tactile feedback. This simplified version would emphasize the performance and mastery of one or more specific tasks, such as the manipulation of the duodenoscope through the organ system.

Indeed, this preferred embodiment could be generalized to a method for teaching a particular skill required for performance of an actual medical procedure to a student. This method would include the step of abstracting a portion of the visual feedback of the actual medical procedure, which would preferably include fewer visual details than the entirety of the visual feedback obtained during the performance of the medical procedure. This portion of the visual feedback would preferably enable the student to learn the motion of the instrument as the required skill.

For example, the simplified version may optionally not feature many, or even most, of the visual details of the organ system as visual feedback. Instead, the organ system would preferably be presented as a smooth, relatively featureless tube having the geometry, dimensions and overall branched structure of the organ system in order to correlate the motion of the simulated duodenoscope through the interior space of the organ system. More preferably, the simplified version would be embodied as a game, in which students would be awarded points for correct manipulation of the duodenoscope, and would be penalized for incorrect manipulations. Thus, the student would have the opportunity to learn the manipulations required for successful duodenoscopy without the distraction of visual details, in a low pressure and even "fun" environment.

Figure 7:
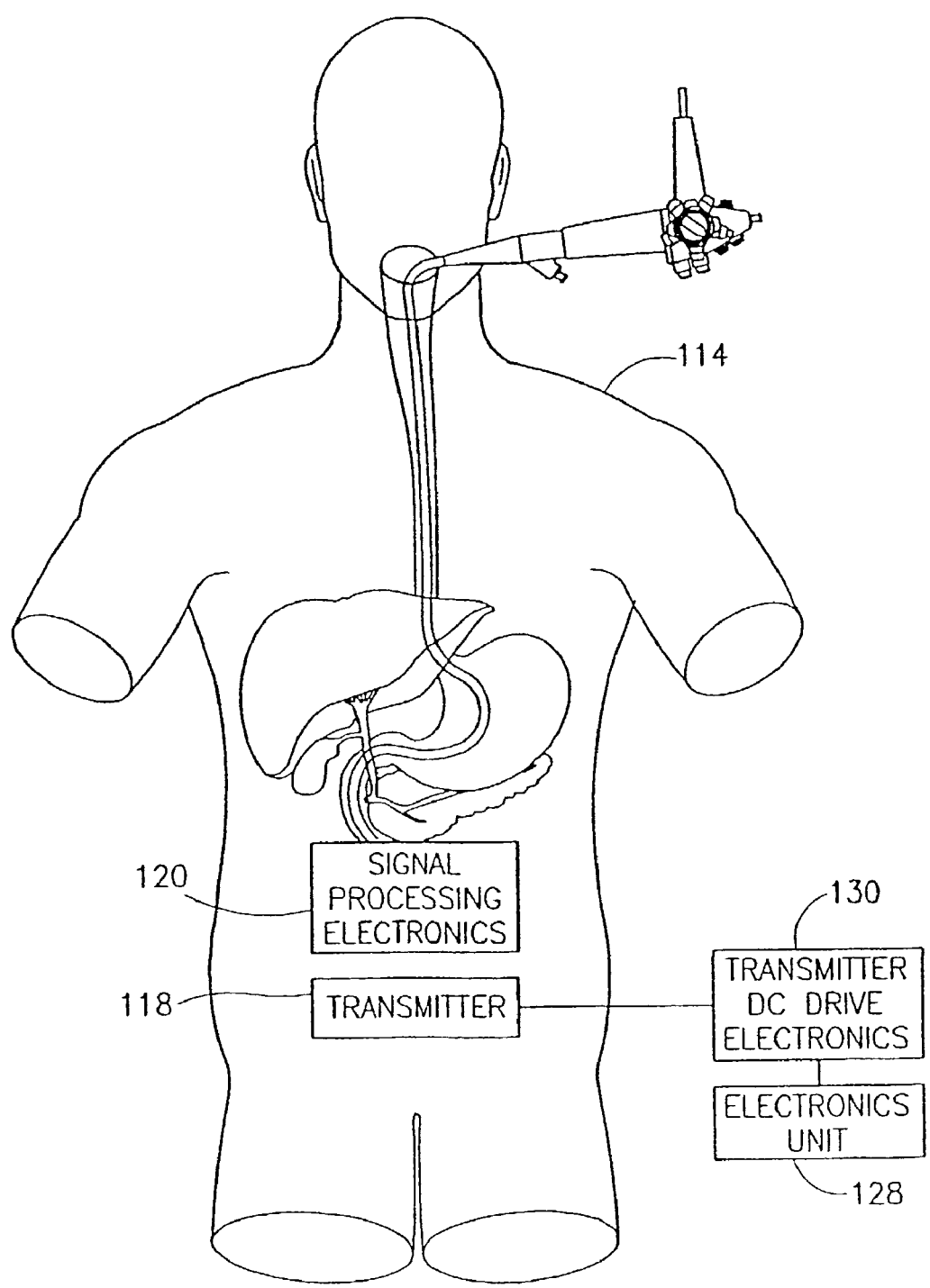
FIG. 7 illustrates an exemplary simulated bilio-pancreatic organ system according to the present invention.
Figure 10:
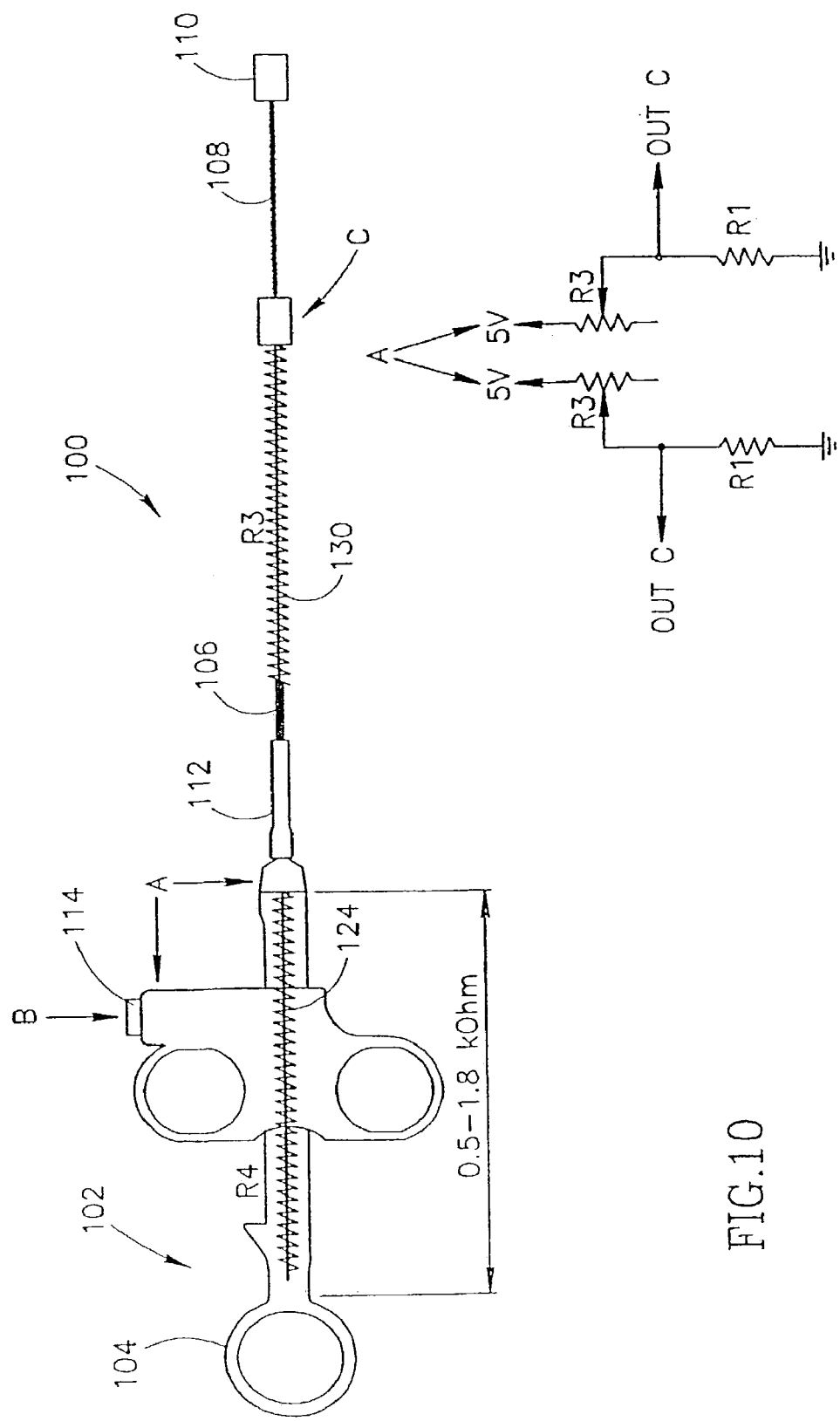
FIG. 10 is a diagram of a simulated catheter according to the present invention.
Figure 11:
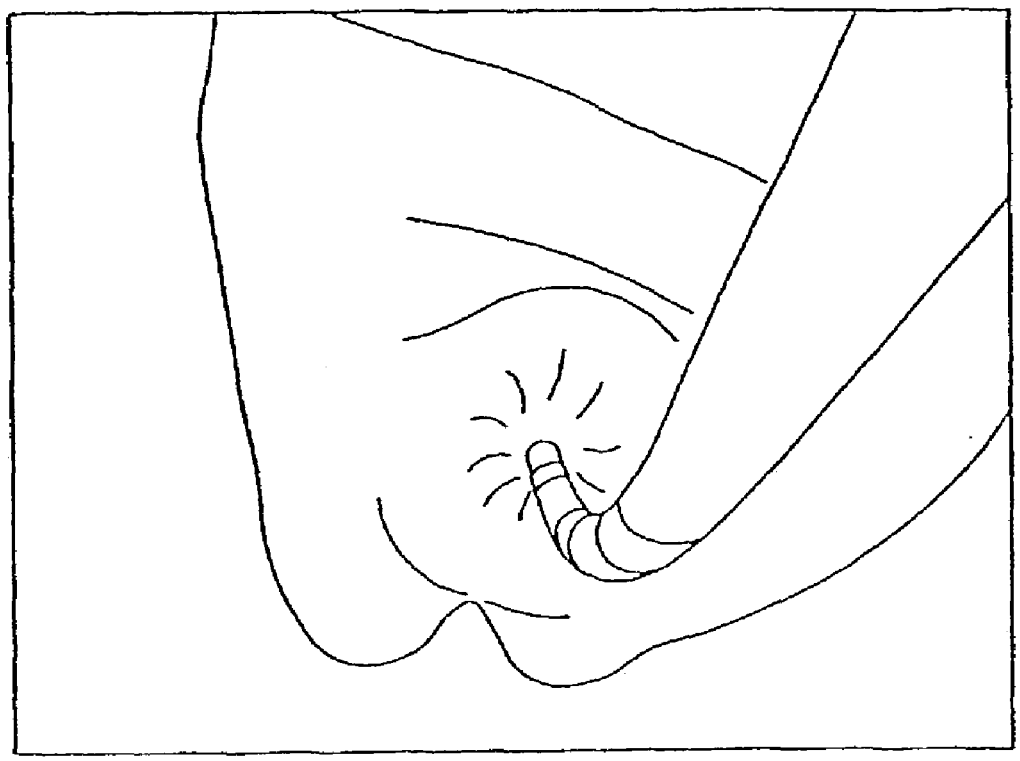
FIG. 11 shows visual feedback from the performance of the simulated medical procedure with the catheter device of FIG. 10.

According to other preferred embodiments of the present invention, the user is preferably provided with the choice of performing a papillotomy, more preferably including the manipulation of various tools, such as the sphincterome of FIGS. 10 and 11, and/or a stent, a basket or a balloon, in order to continue the simulated medical procedure FIG. 7 illustrates the mechanical aspects of an exemplary simulated bilio-pancreatic organ system according to the present invention. A cut-away view of a mannequin 114 is shown in FIG. 7. Preferably, mannequin 114 is about one meter wide, which is within the dimensions of an actual human subject. A simulated bilio-pancreatic organ system 116 is shown within mannequin 114. Simulated bilio-pancreatic organ system 116 is connected to a transmitter 118 and a signal processing device 120, also placed within mannequin 114. As shown, a simulated duodenoscope 122 can be inserted into mannequin 114 through an opening 124. In this case, since the simulation is for duodenoscopy of the bilio-pancreatic organ system of the subject, opening 124 simulates the mouth of the subject.

Simulated duodenoscope 122 can optionally be maneuvered left, right, up and down. Preferably, simulated duodenoscope 122 is about 1800 cm long, similar to the length of a real duodenoscope. Also preferably, the diameter of the tip of simulated duodenoscope 122 is about 13.4 mm, while the remainder of duodenoscope 122 has a diameter of about 10.2 mm, again similar to the dimensions of a real duodenoscope.

Once simulated duodenoscope 122 is inserted into simulated bilio-pancreatic organ system 116, sensor 76 on the tip of simulated duodenoscope 122 is able to detect the location of simulated duodenoscope 122. Sensor 76 preferably has three degrees of freedom, more preferably six degrees of freedom for effective simulation of manipulation of duodenoscope 122. If sensor 76 has six degrees of freedom, the detected directions of orientation include the Cartesian coordinates X, Y, Z, as well as roll, elevation and azimuth. In addition, sensor 76 preferably includes a sensor transmitter 126, so that the precise angle and location of sensor 76 can be determined relative to bilio-pancreatic organ system 116. Sensor transmitter 126 transmits data to signal processing device 120, which then analyzes and processes the signal. The processed signal is then given to transmitter 118 for transmission to an electronics unit 128 and a DC drive unit 130. The signal is converted by DC drive unit 130 and passed to electronics unit 128. Electronics unit 128 then sends the position and orientation of sensor 76 to software interface 74, so that the remainder of the display system is able to use the information to display the correct images on display screen 22 for visual feedback.

Figure 8:
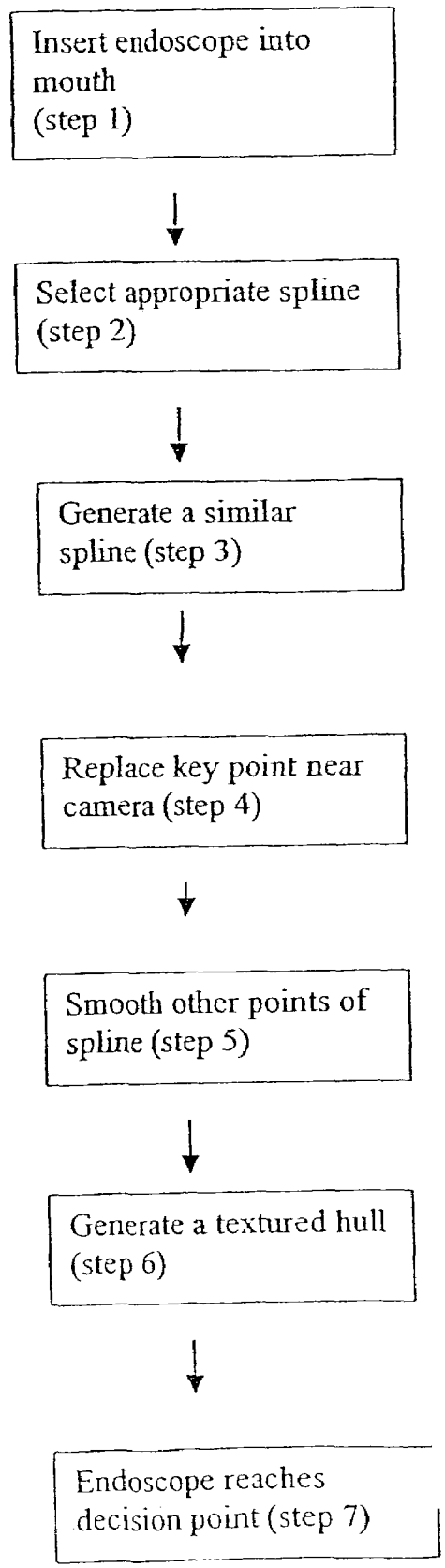
FIG. 8 is a flowchart of an exemplary but preferred method according to the present invention for simulating the operation of the duodenoscope within the bilio-pancreatic organ system.

FIG. 8 is a flowchart of an exemplary but preferred method according to the present invention for simulating the operation of the duodenoscope within the bilio-pancreatic organ system.

In step 1, the duodenoscope is inserted into the mouth of the mannequin. The duodenoscope typically includes a camera, which is also simulated in the present invention, such that images are returned from the movement of the duodenoscope within the bilio-pancreatic system.

In step 2, an appropriate spline is selected for the initial entry structure of the bilio-pancreatic system, preferably modeled as previously described. More preferably, as each junction point is passed, a plurality of splines is used to model the organ system at such a point. More preferably, the selection procedure includes the step of performing a minimization procedure for choosing the closest spline to the duodenoscope in terms of Euclidean distance from the lumen to the camera, and the angle of the camera.

In step 3, a similar spline to the selected spline is generated. Preferably, most of the spline keys for the generated spline are similar or identical to the chosen spline, except for the key point nearest to the camera.

In step 4, the key point nearest to the camera is preferably replaced by a point which is attached to the camera by a specified offset. This specified offset is the position on the duodenoscope from which the duodenoscope exits.

In step 5, the other points of the spline are then smoothed. Random noise is more preferably added to the three-dimensional position of these points. In step 6, the new generated spline is then used to generate a textured hull or shell around the three-dimensional position of these points.

In step 7, the duodenoscope reaches a decision point within the simulated organ system, at which point one of the three possible paths is preferably selected. As previously described, each such path is more preferably modeled by a separate spline or set of splines. Thus, once a particular path has been selected, the corresponding mathematical model is also selected.

At any point during the simulation, and more preferably at every point along the simulated organ system, the end point of the duodenoscope is optionally examined for possible contact with the portion of the organ system through which the duodenoscope is moving. If the duodenoscope has been found to contact the tissue, such as the back of the gall bladder for example, then the duodenoscope either stops or loops around itself. Looping of the duodenoscope is optionally and preferably modeled with a plurality of splines, such that the dimensions of the loop are more preferably determined according to the dimensions of the portion of the organ system, the deformability of that portion, and the amount of the duodenoscope which has been inserted into the organ system. If contact is maintained and/or is performed with sufficient force, then the duodenoscope may perforate the organ, which is then simulated by the present invention.

Figure 9:
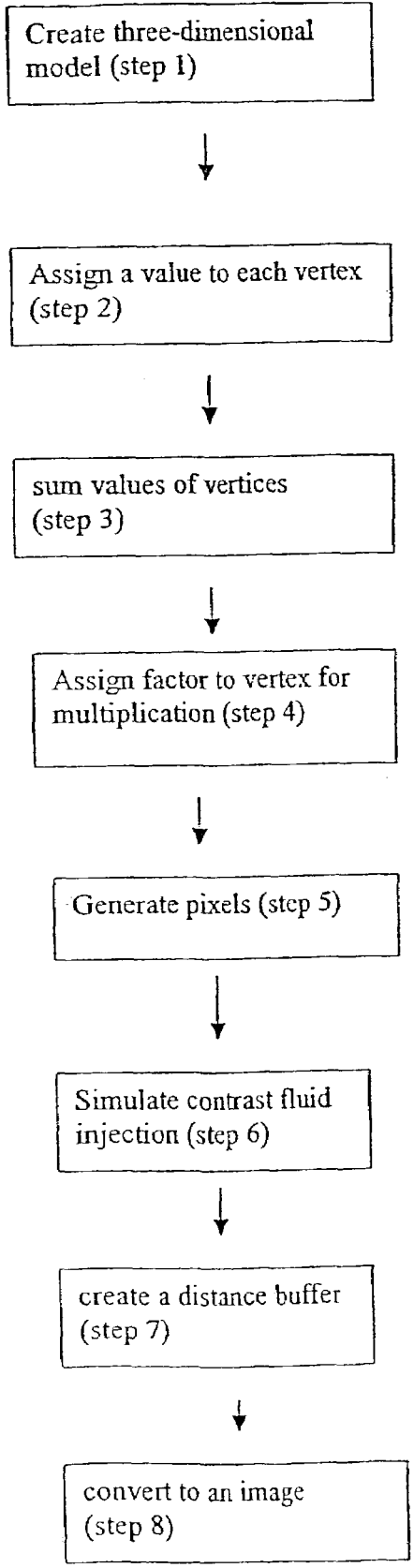
FIG. 9 is a flowchart of an exemplary method for simulating a fluoroscopic procedure for diagnostic radiology within the bilio-pancreatic organ system according to the present invention.

FIG. 9 is a flowchart of an exemplary method for simulating a fluoroscopic procedure for diagnostic radiology within the bilio-pancreatic organ system according to the present invention. Fluoroscopy involves the transmission of a beam of penetrating radiation through at least a portion of the body, in order to receive an image of the internal organ(s) in motion for viewing on the monitor screen. The contrast between portions of the body, such as the internal organs, in medical X-ray photographs (radiographs) is produced by the differential scattering and/or absorption of X-ray radiation by bones and tissues. Such contrast is further heightened by the use of contrast dyes, which are injected at or into the appropriate organ(s) to be visualized. The effect of visualization of at least a portion of the bilio-pancreatic organ system on the displayed images of the duodenoscope is preferably simulated according to the exemplary method which is described with regard to FIG. 8.

As shown, in step 1, a three-dimensional model of at least a portion of the bilio-pancreatic organ system is created, for example as previously described. Preferably, the model includes a plurality of vertices with edges connecting these vertices. Each triplet of edges forms a triangle.

In step 2, each vertex of each triangle is assigned a value which corresponds to the distance of the vertex from the virtual camera and/or tip of the virtual duodenoscope. The sign, whether positive or negative, is determined by the normal of the triangle. If the triangle faces the camera, then the sign is positive. If the triangle faces away from the camera, then the sign is negative.

In step 3, the values of the three vertices are summed. Steps 2 and 3 are a variation of a method which is known in the art as "gouraud shading" (see for example http://library.thinkquest.org/10300/enhanced_pages/3d/gouraud.html). The final result for the generated pixels depends on the width of each body organ.

In step 4, preferably each vertex is also assigned a factor by which it is multiplied, which represents the density of the organ. In step 5, the pixels are then generated.

In step 6, to simulate a contrast fluid injection, which is a comparatively opaque liquid for X-ray radiation, the factors for each vertex are optionally and preferably modified continuously in real time. More preferably, such modification is performed both from the direction of the injection and from inside the organ(s). Most preferably, various parameters are adjusted to control for the amount of injected contrast fluid, the speed of movement of the fluid and the factors for each vertex. Other factors which are optionally and most preferably determined include the contrast factor, or how "visible" the object is with regard to X-ray radiation; and the depth of the object at each point viewed from the point of emission of the X-ray radiation. The contrast factor is determined according to the opacity of an object to X-ray radiation. However, since the present invention preferably employs surface models for simulation of the bilio-pancreatic organ system, the depth of the object is most preferably calculated according to the simulated surface.

An exemplary method for calculating the depth of the object for a contrast fluid injection according to the present invention is described with regard to step 7 of FIG. 9. The method optionally and preferably includes the steps of first creating a two-dimensional memory buffer. This buffer more preferably has the width and height of the screen buffer used for rendering the image, such that each "pixel" of the buffer is actually a real number. The value of the pixels is then set to zero.

Next, the distance is calculated of each vertex of the surface of the bilio-pancreatic organ system, or the portion being rendered thereof, from the emission point of X-ray radiation. The previously described triangular faces are then rendered with the gouraud shading method, but with distance as the interpolated value as previously described. Rendering of the faces is performed differently for those faces which are "facing" the emission point of X-ray radiation, than for those faces which are not. The former are rendered with a negative distance, while the latter are rendered with a positive distance.

Each such distance is multiplied by the contrast factor before the shading process is performed. Then, shading is performed by filling a buffer of distances with the interpolated values of each face. Next, the resultant buffer is used for rendering. The buffer contains delta distances of the bilio-pancreatic organ system from the emission point of radiation, multiplied by the correct contrast factor The distance buffer must then be converted to an image, as described with regard to step 8 of FIG. 9. The distance buffer contains values representing distance, while the required values are those of color. Therefore, preferably the values for the distances are converted to color using a pre-calculated table of values. This table assumes that the exponent of the distance is the value for the reflection of the X-ray radiation at that point, such that the exponent multiplied by the contrast factor, assuming homogeneity, is the amount of X-ray radiation which is blocked. Therefore, the table is used to convert directly from linear distance to the required color, resulting in a black and white (grayscale) image similar to that which would be produced with an actual X-ray machine.

FIG. 10 is a diagram of a simulated catheter according to the present invention, while FIG. 11 shows visual feedback from the performance of the simulated medical procedure with the catheter device. Although the device shown is a simulated sphincterotome, it is understood that any type of simulated catheter could be so constructed. The simulated catheter of the present invention features a relatively minimal adaptation of an existing medical tool. These changes enable both tactile force feedback to be provided and the relative location of the simulated device within the simulated bilio-pancreatic system to be determined, thereby enabling both the physical and visual aspects of the medical procedure to be simulated.

FIG. 10 is a diagram of a simulated catheter device 100. As shown, simulated catheter device 100 features a tool body 102, to which a mobile handle 104 is attached. The human operator moves mobile handle 104 in a lateral direction, such that mobile handle 104 is displaced. The displacement of mobile handle 104 causes a flexible cable 106, to which mobile handle 104 is attached, to be moved. The movement of flexible cable 106 in turn causes the position of a cutting portion 108 to be displaced in the lateral direction.

The lateral displacement of cutting portion 108 in turn determines whether simulated catheter device 100 is in the retracted position with regard to a simulated duodenoscope 110, or alternatively extended into simulated duodenoscope 110. When the human operator wishes to position cutting portion 108 for performing a simulated sphincterotomy procedure, cutting portion 108 is extended into simulated duodenoscope 110. Suitable visual and tactile feedback must then be provided for the performance of the simulated biopsy procedure.

Simulated catheter device 100 preferably provides such force feedback through potentiometry, which is the use of electrical current to generate and adjust physical resistance. Potentiometry has a number of advantages over the use of mechanical components to provide such physical resistance, including the greater ability to adjust the resistance through potentiometry; the reduction in the number of mechanical moving parts which are required; and decreased physical wear on the simulated tool. Thus, potentiometry is particularly preferred for providing tactile, force feedback for the simulated tool of the present invention.

As shown, potentiometric resistance is provided by passing an electrical current through simulated catheter device 100. The electrical current is supplied through an electrical supply 112, which is connected to flexible cable 106. The amount of current is preferably adjusted in order to provide finely tuned physical feedback, by adjusting resistance on simulated catheter device 100.

Unfortunately, potentiometry has one drawback: it is extremely difficult to provide potentiometric resistance on a flexible, moving object, as potentiometry requires an electrical current to be passed through the object. There is no solution which is known in the prior art for this problem The simulated tool of the present invention solves this problem, as shown, by not directly attaching the entirety of electrical supply 112 to flexible cable 106. Instead, only a negative electrode 114 is attached to flexible cable 106.

A positive electrode 124 is shown. Electricity is passed through positive electrode 124, which does not contact flexible cable 106 directly. Instead, electricity is preferably passed indirectly, to a spiral wire 130 which is wrapped around flexible cable 106. Spiral wire 130 is preferably made from a chrome-nickel alloy, and more preferably has a thickness of about 0.08 mm. In comparison, flexible cable 106 preferably has a thickness of about 1.1 mm. The relatively thinness of spiral wire 130 enables positive electrode 124 to be easily added to an existing medical device in order to form the simulated tool of the present invention. Spiral wire 130 is preferably held against flexible cable 106 by tubing, which could be Teflon™ for example.

The present invention provides potentiometric resistance on a flexible, moving object, which had not been previously known in the prior art. In addition, the present invention has the advantage of providing such resistance in a linear manner, such that the amount of resistance is linear over the length of flexible cable 106. The amount of resistance is optionally determined by receiving the analog electrical signal, and converting the signal to digital output. The digital output can then optionally be used with the computer of FIG. 3, for example in order to determine the distance which has been traveled by flexible cable 106.

The linearity of such resistance is important for a number of reasons. First, the distance which flexible cable 106 has traveled is directly proportional to the amount of resistance. The determination of such distance is important for the simulation of the medical procedure, since the provision of suitable visual feedback depends upon determining the location of flexible cable 106 within the simulated duodenoscope and/or bilio-pancreatic system. Second, the provision of linear resistance enables the amount of resistance to be finely determined in a highly sensitive manner. Thus, the preferred provision of linear resistance is highly useful.

Figure 12:
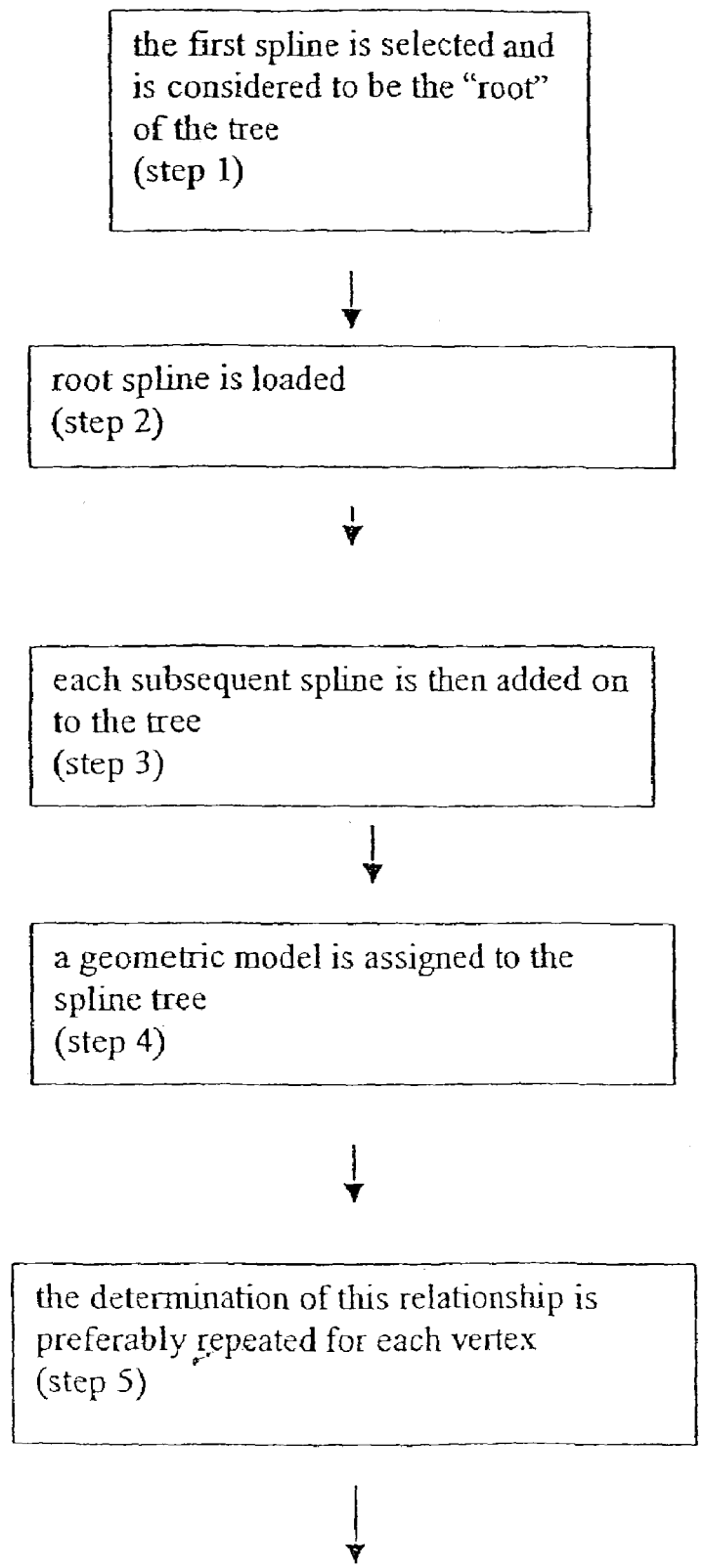
FIG. 12 is a flowchart of an exemplary method according to the present invention for mathematical modeling of a complex topographical structure.

FIG. 12 is a flowchart of an exemplary method according to the present invention for mathematical modeling of a complex topographical structure, such as the pancreatic organ system. As previously described with regard to FIG. 5A, preferably such an organ system is modeled according to at least one spline, and more preferably according to a plurality of splines, which are optionally and most preferably arranged as a tree of splines or other branched structure. The method which is described below is also more generally applicable for modeling topographically complex structures. This method depends upon the generation of multiple splines, and upon the manipulation of models which are based upon such multiple splines. A spline is a curve in three-dimensional space.

A "Multi-Spline" is actually a tree with nodes which are themselves splines. For each node there is an undefined number of children, each of them representing a split in the path of the spline, and each maintaining the path of the spline continuously. The first derivative for each curve is also preferably continuous for each child.

This tree of splines is later assigned to a geometric model of a complex topographical structure, thereby enabling manipulations of the geometric model to be performed according to information which is provided by the tree of splines. For example, the multi-spline could optionally provide such information as the location of any given point on the model with regard to branches of the tree of splines, the distance from each node, the time parameter for each node and so forth.

The tree of splines is generated as shown with regard to FIG. 12, from a set of single splines. In step 1, the first spline is selected and is considered to be the "root" of the tree. In step 2, the root spline is loaded, and preferably kept as a whole, optionally and more preferably after being reparameterized by distance.

In step 3, each subsequent spline is then added on to the tree, preferably as follows. First, the distance of the first key point of the new spline from each of the existing spline nodes is tested, thus finding the branch which is more likely to contain the split for this new spline. Next, the first key point is moved to fit exactly on this branch, preferably at the appropriate time parameter. Then, the derivative at that point is determined according to the derivative for the branch at that point, thus continously expanding the point. The split may optionally occur at either a middle of a branch or at the ending of such a branch. Step 3 is preferably repeated until all of the splines have been added to the tree.

In step 4, a geometric model is assigned to the spline tree. In order to assign a model to a spline tree, a relationship is preferably determined between each point, or vertex, of the geometric model, to a particular branch of the tree. More preferably, the relationship includes the determination of the correct parameters for that branch. These parameters optionally and most preferably include, but are not limited to, time, which may also be considered the distance parameter, angle, which is measured on the plane perpendicular to the derivative of the branch at that time value, and radius, which is the distance from the spline at that time value. In step 5, the determination of this relationship is preferably repeated for each vertex.

In step 6, the geometric model is more preferably manipulated according to this new information. A simple method for manipulation is to manipulate the key points of the various branches by using the time, angle and radius parameters calculated earlier, in order to reconstruct the geometric model according to the new spline tree.

Another type of optional manipulation is for simulating contrast fluid flow under Xray visualisation. If introduction of such fluids is considered to occur at some point at the model, the closest spline branch to the point of introduction is preferably found, more preferably with the time/angle/radius points. Next, a color, or contrast, is assigned to each vertex of the model, based on the distance of the time parameter from the point of the injection.

When a split is encountered in the tree, the start time for each child spline is naturally the end time of the parent spline, such that the coloring process is pursued recursively throughout the entire spline tree.

In step 7, navigation is performed within the multi-spline model. Navigation or movement inside such objects is done the same way as through single spline based objects. One additional problem which has arisen occurs at a split point at the spline. The decision is based on the direction of the tip of the tool being introduced into the model, such as an endoscope, a catheter or any other flexible tool for example. The distance of the tip from each of the children of the splines is determined, and the closest one is chosen.

It will be appreciated that the above descriptions are intended only to serve as examples, and that many other embodiments are possible within the spirit and the scope of the present invention.

What is claimed:

1. A system for performing a simulated medical bilio-pancreatic duodenoscopy procedure, comprising (a) at least a portion of a simulated bilio-pancreatic organ system; (b) a simulated duodenoscope for performing the simulated medical bilio-pancreatic duodenoscopy procedure on said at least a portion of said simulated bilio-pancreatic organ system; (c) a locator for determining a location of said simulated duodenoscope within said simulated at least a portion of a simulated bilio-pancreatic organ system; and (d) a visual display for displaying images according to said location of said simulated duodenoscope within said simulated at least a portion of a simulated bilio-pancreatic organ system for providing visual feedback, such that said images simulate actual visual data received during an actual medical procedure as performed on an actual subject, wherein said displayed images comprise a mathematical model for modeling said at least a portion of a simulated bilio-pancreatic organ system according to a corresponding at least a portion of an actual bilio-pancreatic organ system and said mathematical model features a plurality of splines, said plurality of splines being arranged as a branched structure.

2. The system of claim 1, wherein said mathematical model features a plurality of splines, wherein each of a duodenum, a bile duct and a pancreatic duct is modeled with a spline by deforming said spline to model a geometry of each organ.

3. The system of claim 1, wherein a gall bladder is modeled as a plurality of splines to define a three-dimensional open volume of said gall bladder.

4. The system of claim 1, wherein a junction between any two portions of said bilio-pancreatic organ system is modeled with a plurality of splines.

5. The system of claim 1, wherein said location of said simulated duodenoscope within said simulated bilio-pancreatic organ system is mapped to said at least one spline in coordinates of time, angle and radius.

6. The system of claim 5, wherein a local deformation to a portion of said simulated bilio-pancreatic organ system is modeled according to a deformation of at least one spline for modeling said portion.

7. The system of claim 6, wherein a plurality of mapped coordinates of said local deformation is transformed from time, angle and radius to x, y and z, such that a volume of said local deformation is determined according to said radius.

8. The system of claim 7, wherein said local deformation is modeled by adding polygons to said at least one spline to stretch a plurality of points at said local deformation.

9. The system of claim 1, wherein said mathematical model features a plurality of paths, and each path is automatically switched according to said location of said simulated duodenoscope within said simulated at least a portion of a simulated bilio-pancreatic organ system.

10. The system of claim 9, wherein said mathematical model features a plurality of switching objects at each junction of a plurality of paths, such that as a location of at least a portion of said simulated duodenoscope corresponds to a location of said switching object, said mathematical model is switched to a corresponding path.

11. The system of claim 1, wherein said simulated duodenoscope is represented by a single path mathematical model.

12. The system of claim 1, wherein at least a portion of visual data for said images is obtained from actual video data recorded during a performance of said actual medical procedure.

13. The system of claim 12, wherein said actual video data is added to said images as texture mapping.

14. The system of claim 13, wherein said texture mapping also includes animation.

15. The system of claim 1, wherein at least a portion of visual data for said images is obtained from actual imaging data recorded during a performance of a medical procedure selected from a group including at least one of a MRI procedure, a CAT scan procedure and a fluoroscopic procedure for diagnostic radiology.

16. The system of claim 1, wherein said mathematical model is divided into a plurality of portions, such that said simulated duodenoscope moves through said plurality of portions in sequential order.

17. The system of claim 16, wherein a limited number of said portions is processed for displaying said images according to said location of said simulated duodenoscope.

18. The system of claim 17, wherein said simulated duodenoscope further comprises a simulated camera and said limited number of said portions is selected according a line of sight of said simulated camera.

19. The system of claim 1, further comprising an additional simulated tool for performing an additional simulated procedure in conjunction with said simulated duodenoscope.

20. The system of claim 19, wherein said additional simulated tool further comprises a simulated catheter for receiving said additional simulated tool, said simulated catheter being inserted into said simulated duodenoscope.

21. The system of claim 20, wherein said simulated catheter provides force feedback for an operation of said additional simulated tool through potentiometry, such that an amount of current passed through said simulated catheter determines an amount of said force feedback.

22. The system of claim 21, wherein said simulated additional tool further comprises a grasping portion for being grasped and said simulated catheter further comprises: a flexible cable for being attached to said grasping portion; a negative electrode for being attached to said flexible cable, and a positive electrode for being wrapped around at least a portion of said flexible cable.

23. A method for performing a simulated duodenoscopic procedure on a simulated bilio-pancreatic organ system, comprising providing a system for performing the simulated duodenoscopic procedure, said system comprising a simulated duodenoscope;

inserting said simulated duodenoscope into the simulated bilio-pancreatic organ system;

receiving visual feedback according to said displayed image; and receiving tactile feedback according to said location of said duodenoscope within the simulated bilio-pancreatic organ system;

providing a mathematical model for modeling said at least a portion of the simulated bilio-pancreatic organ system according to a corresponding at least a portion of an actual bilio-pancreatic organ system and modeling said at least a portion of the simulated bilio-pancreatic organ system according to a corresponding at least a portion of an actual bilio-pancreatic organ system:

said provided mathematical model featuring a plurality of splines, arranged as a branched structure.

24. The method of claim 23, wherein said mathematical model features a plurality of splines, wherein each of a duodenum, a bile duct and a pancreatic duct is modeled with a spline by deforming said spline to model a geometry of each organ.

25. The method of claim 23, wherein a gall bladder is modeled as a plurality of splines to define a three-dimensional open volume of said gall bladder.

26. The method of claim 23, wherein a junction between any two portions of said bilio-pancreatic organ system is modeled with a plurality of splines.

27. The method of claim 23, wherein said location of said simulated duodenoscope within said simulated bilio-pancreatic organ system is mapped to said at least one spline in coordinates of time, angle and radius.

28. The method of claim 27, wherein a local deformation to a portion of said simulated bilio-pancreatic organ system is modeled according to a deformation of at least one spline for modeling said portion.

29. The method of claim 28, wherein a plurality of mapped coordinates of said local deformation is transformed from time, angle and radius to x, y and z, such that a volume of said local deformation is determined according to said radius.

30. The method of claim 29, wherein said local deformation is modeled by adding polygons to said at least one spline to stretch a plurality of points at said local deformation.

31. The method of claim 23, wherein said mathematical model features a plurality of paths, and each path is automatically switched according to said location of said simulated duodenoscope within said simulated at least a portion of a simulated bilio-pancreatic organ system.

32. The method of claim 31, wherein said mathematical model features a plurality of switching objects at each junction of a plurality of paths, such that as a location of at least a portion of said simulated duodenoscope corresponds to a location of said switching object, said mathematical model is switched to a corresponding path.

33. The method of claim 23, wherein said simulated duodenoscope is represented by a single path mathematical model.

34. The method of claim 23, wherein said mathematical model is divided into a plurality of portions, such that said simulated duodenoscope moves through said plurality of portions in sequential order.

35. The method of claim 23, wherein each branch of said actual bilio-pancreatic organ system is represented by at least one spline of said branched structure.

36. A method for modeling a topographical structure, said structure comprising at least a portion of an actual bilio-pancreatic organ system, the method comprising:

providing a geometric model for the structure;

constructing a multi-spline tree from a plurality of splines; and mapping a relationship between said geometric model and said multi-spline tree to model the structure thereby modeling said at least a portion of a simulated bilio-pancreatic organ system.

37. The method of claim 36, wherein constructing said multi-spline tree further comprises: selecting a first spline from said plurality of splines as a root spline; and adding each other spline from said plurality of splines to said root spline to form a branch spine.

38. The method of claim 37, wherein mapping said relationship, includes mapping each point of said geometric model to a branch spline.

39. The method of claim 38, further comprising: navigating to at least one other point on said geometric model according to said multi-spline tree.

40. The system of claim 1, wherein each branch of said actual bilio-pancreatic organ system is represented by at least one spline of said branched structure.

* * * * *